United States Patent
Takano

(10) Patent No.: US 9,706,554 B2
(45) Date of Patent: Jul. 11, 2017

(54) COMMUNICATION CONTROL APPARATUS, TERMINAL APPARATUS, AND COMMUNICATION CONTROL METHOD

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 14/402,854

(22) PCT Filed: Mar. 14, 2013

(86) PCT No.: PCT/JP2013/057237
§ 371 (c)(1),
(2) Date: Nov. 21, 2014

(87) PCT Pub. No.: WO2013/183332
PCT Pub. Date: Dec. 12, 2013

(65) Prior Publication Data
US 2015/0110083 A1    Apr. 23, 2015

(30) Foreign Application Priority Data

Jun. 5, 2012    (JP) .................................. 2012-128217

(51) Int. Cl.
*H04W 72/04*    (2009.01)
*H04W 16/14*    (2009.01)
(Continued)

(52) U.S. Cl.
CPC ...... *H04W 72/0453* (2013.01); *H04B 7/2621* (2013.01); *H04W 16/14* (2013.01);
(Continued)

(58) Field of Classification Search
None
See application file for complete search history.

(56) References Cited

U.S. PATENT DOCUMENTS

2011/0267978 A1    11/2011    Etemad
2013/0016221 A1*    1/2013    Charbit ................. H04W 16/14
                                                        348/180
(Continued)

FOREIGN PATENT DOCUMENTS

JP    2001-518766 A    10/2001
JP    2009-049904 A    3/2009
(Continued)

OTHER PUBLICATIONS

ETSI "Reconfigurable Radio Systems (RRS); Use Cases for Operation in White Space Frequency Bands", published in 2011, and submitted as prior art by the applicant.*
(Continued)

*Primary Examiner* — Andrew Lai
*Assistant Examiner* — Jamaal Henson
(74) *Attorney, Agent, or Firm* — Chip Law Group

(57) ABSTRACT

There is provided a communication control apparatus including a radio communication unit configured to wirelessly communicate with a terminal apparatus to which a first operator provides a radio communication service, the terminal apparatus being capable of radio communication by using one primary frequency band and at least one secondary frequency band, and a control unit configured to control access of the terminal apparatus in a manner that a frequency band among one or more frequency bands owned by a second operator is not used as the one primary frequency band of the terminal apparatus, the frequency band being temporarily used by the first operator.

11 Claims, 22 Drawing Sheets

(51) Int. Cl.
*H04W 56/00* (2009.01)
*H04W 28/16* (2009.01)
*H04B 7/26* (2006.01)

(52) U.S. Cl.
CPC ....... *H04W 28/16* (2013.01); *H04W 56/0005* (2013.01); *H04W 56/001* (2013.01)

(56) References Cited

U.S. PATENT DOCUMENTS

| | | | |
|---|---|---|---|
| 2013/0142059 A1* | 6/2013 | Di Girolamo | H04L 12/66 370/252 |
| 2013/0210447 A1* | 8/2013 | Moe | H04W 72/0486 455/453 |

FOREIGN PATENT DOCUMENTS

| | | | |
|---|---|---|---|
| JP | 2012-015992 A | 1/2012 | |
| JP | 2012-034326 A | 2/2012 | |
| JP | 2013-545365 A | 12/2013 | |

OTHER PUBLICATIONS

No Author Listed, Reconfigurable radio systems; use cases for operation in white space frequency bands. European Telecommunications Standards Institute Technical Report. 2011;102 907 v1.1.1:40-45.

Office Action Received for Japanese Patent Application No. 2014-519856 Mailed on Oct, 20, 2015, 4 Pages of Office Action.

ETSI, "Reconfigurable Radio Systems (RRS); Use Cases for Operation In White Space Frequency Bands", ETSI TR 102 907 V1.1.1(Oct. 2011), ETSI, Oct. 2011, pp. 15.

LG Electronics, "Discussions on Synchronized New Carrier Type", 3GPP TSG-RAN WG1 Meeting #69 R1-122276, May 21-25, 2012, pp. 5, Prague, Czech Republic.

NEC Group, "Configurable Time-Frequency Locations for PSS/SSS Signals on the NCT", 3GPP TSG-RAN WG1 #68BIS, R1-121808, Mar. 26-30, 2012, pp. 8, Jeju, Korea.

* cited by examiner

COMMUNICATION CONTROL APPARATUS, TERMINAL APPARATUS, AND COMMUNICATION CONTROL METHOD

TECHNICAL FIELD

The present disclosure relates to a communication control apparatus, a terminal apparatus, and a communication control method.

BACKGROUND ART

High speed cellular radio communication schemes such as long term evolution (LTE) and WiMAX have been put into practical use in recent years, remarkably increasing communication rates of radio communication services for mobile users. Furthermore, the introduction of the fourth generation cellular radio communication schemes such as LTE-Advanced (LTE-A) will be expected to increase communication rates much more.

Meanwhile, more and more applications that require high data rates are used with a rapid increase in the number of mobile users. As a result, the development of cellular radio communication schemes has not yet satisfied all the needs of mobile users. Accordingly, techniques for effective use of frequency resources are developed in order to maintain or increase communication rates.

For example, Patent Literature 1 discloses a technique for helping share communication resources between a plurality of secondary communication services.

CITATION LIST

Patent Literature

Patent Literature 1: JP 2012-34326A

SUMMARY OF INVENTION

Technical Problem

Frequency sharing between different operators may, however, make the processing by a base station more complicated. For example, when a first operator leases a frequency band (e.g. a component carrier (CC)) to a second operator, a base station of the first operator uses the leased frequency band to communicate with a terminal apparatus of the second operator in one technique of leasing a frequency band. The terminal apparatus of the second operator may then also use the leased frequency band as a primary frequency band (e.g. a primary component carrier (PCC)) for transmitting and receiving an important control signal. In this case, the terminal apparatus of the second operator does not use the primary frequency band for communicating with a base station of the second operator, so that the base station of the second operator cannot freely transmit a control signal to the terminal apparatus of the second operator. As a result, the base station of the second operator transmits a control signal to the terminal apparatus via the base station of the first operator. Accordingly, base stations of different operators have to communicate with each other, and a lessor base station needs to transmit a control signal to a lessee terminal apparatus. This use of a leased frequency band as a primary frequency band of a terminal apparatus may make the processing by a base station more complicated.

It is then desirable to provide a mechanism that can prevent the processing by a base station from becoming more complicated in the frequency sharing between different operators.

Solution to Problem

According to the present disclosure, there is provided a communication control apparatus including a radio communication unit configured to wirelessly communicate with a terminal apparatus to which a first operator provides a radio communication service, the terminal apparatus being capable of radio communication by using one primary frequency band and at least one secondary frequency band, and a control unit configured to control access of the terminal apparatus in a manner that a frequency band among one or more frequency bands owned by a second operator is not used as the one primary frequency band of the terminal apparatus, the frequency band being temporarily used by the first operator.

Further, according to the present disclosure, there is provided a terminal apparatus including a radio communication unit capable of wirelessly communicating with a base station by using one primary frequency band and at least one secondary frequency band, and a control unit configured to, when a synchronization signal is not arranged at a position in a frequency direction which is searched for by the terminal apparatus in a frequency band among one or more frequency bands owned by a second operator which is temporarily used by a first operator that provides a radio communication service to the terminal apparatus, and when the frequency band temporarily used by the first operator is used as the secondary frequency band of the terminal apparatus, perform synchronization in the frequency band by using the frequency band without using the synchronization signal at the position in the frequency direction in a manner that the frequency band temporarily used by the first operator is not used as the one primary frequency band of the terminal apparatus.

Still further, according to the present disclosure, there is provided a communication control method including wirelessly communicating with a terminal apparatus to which a first operator provides a radio communication service, the terminal apparatus being capable of radio communication by using one primary frequency band and at least one secondary frequency band, and controlling access of the terminal apparatus in a manner that a frequency band among one or more frequency bands owned by a second operator is not used as the one primary frequency band of the terminal apparatus, the frequency band being temporarily used by the first operator.

Advantageous Effects of Invention

According to the present disclosure as described above, it becomes possible to prevent the processing by a base station from becoming more complicated in the frequency sharing between different operators.

DESCRIPTION OF EMBODIMENTS

Figure 1:
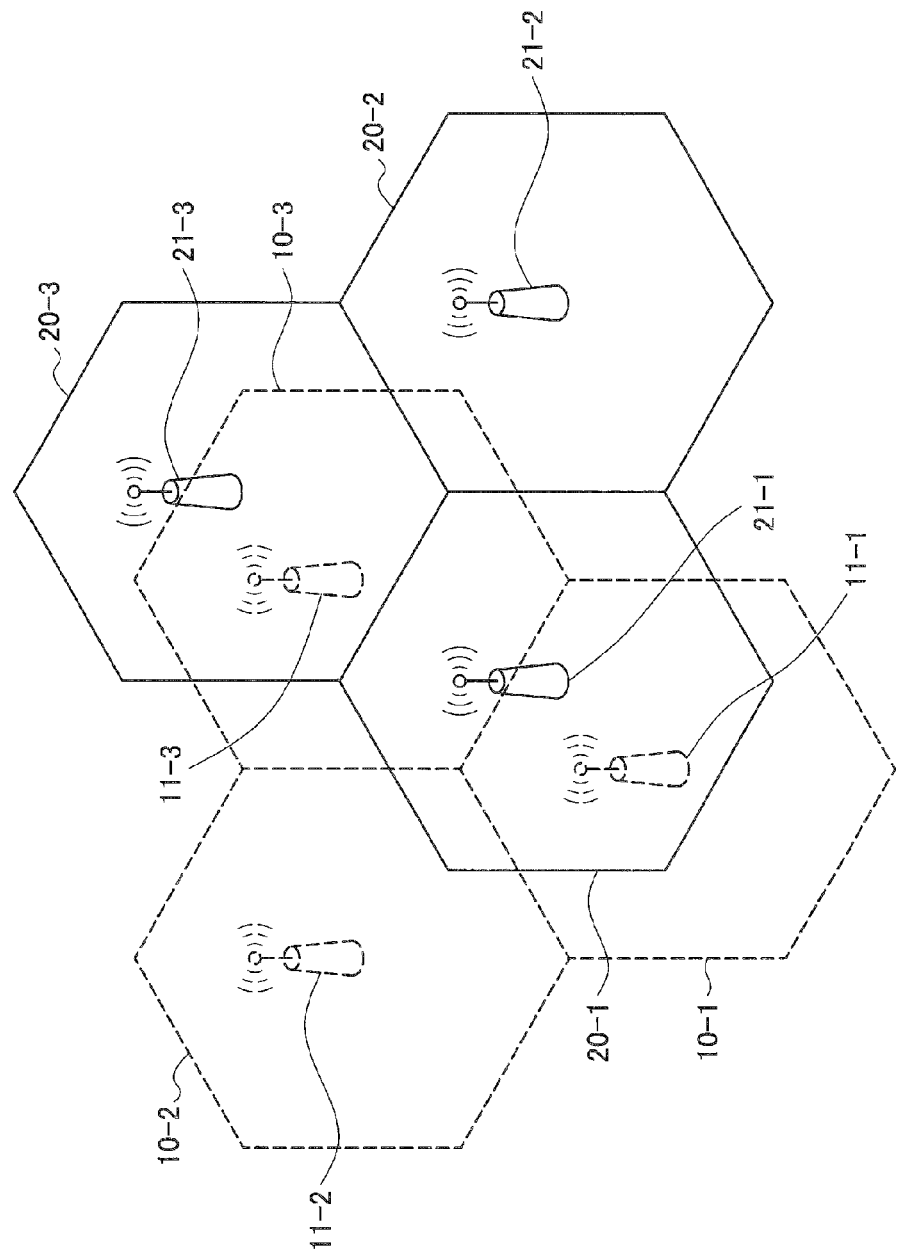
FIG. 1 is an explanatory diagram for describing an example of areas for radio communication services of two operators.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Introduction
   1.1. Technical Field for Effective Use of Frequency Resource
   1.2. Frequency Sharing between Different Operators
   1.3. Overview of Carrier Aggregation
   1.4. Technical Problem
2. First Embodiment
   2.1. Overview
   2.2. Configuration of Lessor eNodeB
   2.3. Configuration of Lessee eNodeB
   2.4. Configuration of Lessee UE
   2.5. Procedure of Processing
   2.6. First Modified Example
   2.7. Second Modified Example
   2.8. Third Modified Example
   2.9. Fourth Modified Example
3. Second Embodiment
   3.1. Overview
   3.2. Configuration of Lessor eNodeB
   3.3. Configuration of Lessee eNodeB
   3.4. Configuration of Lessee UE
   3.5. Procedure of Processing
4. Conclusion <<1. Introduction>>

First of all, a technical field for effective use of a frequency resource, frequency sharing between different operators, the overview of carrier aggregation, and the technical problem will be described with reference to FIGS. 1 to 7.

<1.1. Technical Field for Effective Use of Frequency Resource>

First of all, the technical field for effective use of a frequency resource will be described. For example, the following technical fields are representative of the technical field for effective use of a frequency resource.

frequency sharing within a single operator frequency sharing between different operators frequency secondary use for effectively using a frequency resource in a temporally or spatially idle state real-time auction of a frequency resource in an idle state First, frequency sharing within a single operator is a technique of improving utilization efficiency of a frequency resource with the frequency resource leased between communication systems of the same operator in different communication schemes. The different communication schemes are wideband code division multiple access (W-CDMA) and long term evolution (LTE) as an example. For example, a rapidly increased traffic volume in a LTE network and a small traffic volume in a W-CDMA network temporarily allow a part of the frequency resource in the W-CDMA network to be used in the LTE network. As a result, it becomes possible to increase the communication capacity of the LTE network, which leads to an increase in the total traffic volumes of both W-CDMA network and LTE network. In other words, it becomes possible to increase the number of terminal apparatuses that can be accommodated in both W-CDMA network and LTE network.

Second, frequency sharing between different operators is a technique of improving utilization efficiency of a frequency resource with the frequency resource leased between communication systems of the different operators. It is assumed in this frequency sharing that different operators (such as an operator A and an operator B) are concurrently providing radio communication services in the same area. For example, the operator A and the operator B each provide a radio communication service of LTE. For example, a rapidly increased traffic volume in a LTE network of the operator B and a small traffic volume in a LTE network of the operator A temporarily allow a part of the frequency resource in the LTE network of the operator A to be used in the LTE network of the operator B. As a result, it becomes possible to increase the communication capacity of the LTE network of the operator B, which leads to an increase in the traffic volume in the LTE network of the operator B.

Third, frequency secondary use for efficiently using a frequency resource in a temporally or spatially idle state is a technique of improving utilization efficiency of a frequency resource with the frequency resource leased between a primary system and a secondary system. The primary system is a main system having priority. For example, the primary system is a radio communication system of LTE. For example, the secondary system is a dedicated radio communication system of LTE including a radio LAN system or a Home eNodeB and a user equipment (UE) in the neighborhood thereof. For example, when the primary system has a frequency resource unused, the secondary system temporarily uses this frequency resource.

Fourth, real-time auction of a frequency resource in an idle state is a technique of leasing a frequency resource in an idle state at auction to an operator that hopes to use this frequency resource.

Additionally, the present disclosure focuses on the frequency sharing between different operators. The present disclosure describes, for example, a technique required when this technique is applied to a LTE-A platform.

<1.2. Frequency Sharing Between Different Operators>

Next, the frequency sharing between different operators will be described with reference to FIGS. 1 to 5. As discussed above, a frequency resource is leased between communication systems of different operators. It is also assumed that different operators (such as an operator A and an operator B) are concurrently providing radio communication services in the same area.

(Basic Premise)

FIG. 1 is an explanatory diagram for describing an example of an area for radio communication services of two operators. FIG. 1 illustrates cells 10 of an operator A forming an area for a radio communication service of the operator A, and cells 20 of an operator B forming an area for an operator B radio communication service. eNodeBs 11 of the operator A are positioned at the centers of the cells 10 of the operator A, while eNodeBs 21 of the operator B are positioned at the centers of the cells 20 of the operator B. For example, when the eNodeBs 11 of the operator A are arranged in the neighborhood of the eNodeBs 21 of the operator B in this way, the operator A and the operator B concurrently provide radio communication services of LTE-A in the same area. Additionally, eNodeBs are arranged by each operator.

Since the operator A and the operator B are providing the radio communication services in the same area, a frequency band owned by the operator A is different from a frequency band owned by the operator B. This point will be described more specifically below with reference to FIG. 2.

Figure 2:
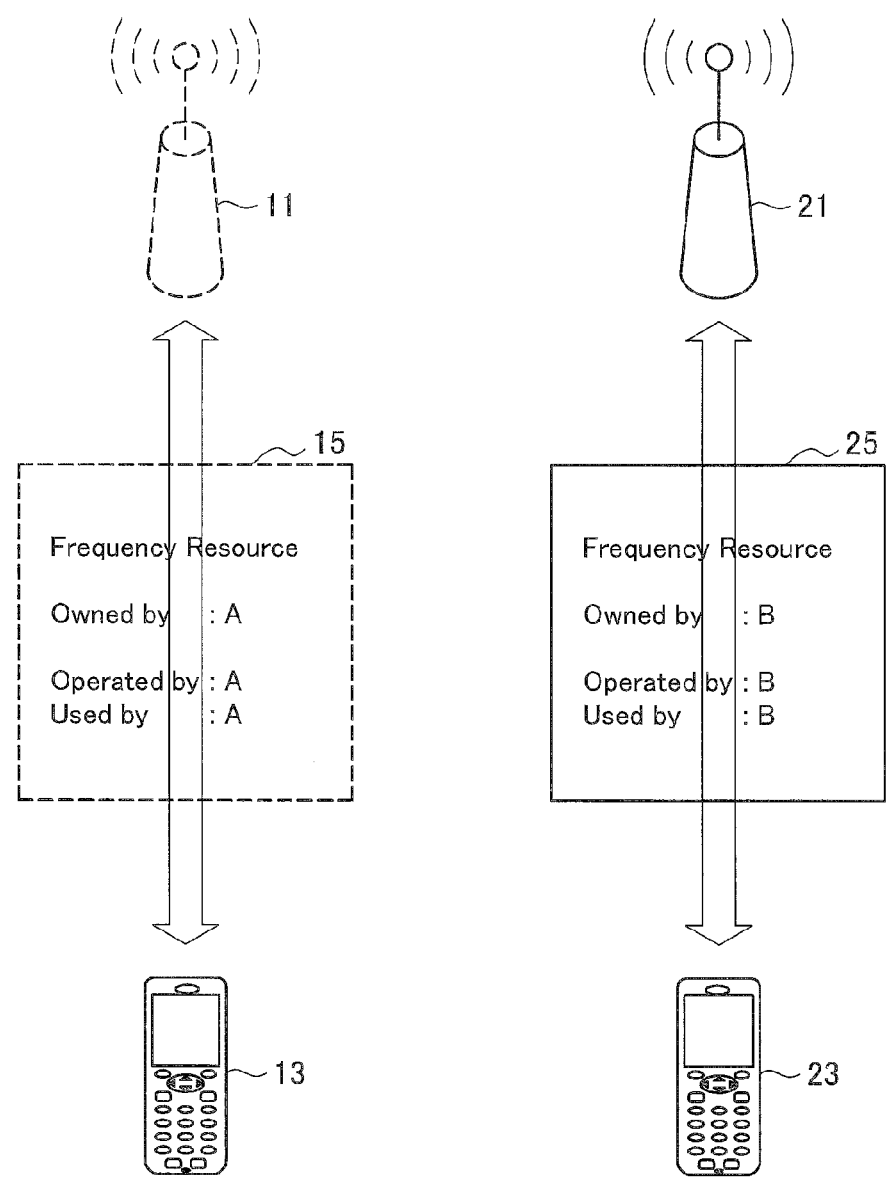
FIG. 2 is an explanatory diagram for describing an example of frequency bands owned by different operators.

FIG. 2 is an explanatory diagram for describing an example of frequency bands each owned by different operators. FIG. 2 illustrates an eNodeB 11 of the operator A, an eNodeB 21 of the operator B, a UE 13 to which the operator A provides a radio communication service, and a UE 23 to which the operator B provides a radio communication service. The operator A owns a frequency band 15, while the operator B owns a frequency band 25. That is, the operator A is allocated the frequency band 15, while the operator B is allocated the frequency band 25.

The frequency band 15 is used for the radio communication of the UE 13 of the operator A in the example of FIG. 2 because no frequency band is leased between different operators. The frequency band 15 is operated by the eNodeB 11 of the operator A. That is, the communication in the frequency band 15 is controlled by the eNodeB 11 of the operator A. Meanwhile, the frequency band 25 is used for the radio communication of the UE 23 of the operator B. The frequency band 25 is operated by the eNodeB 21 of the operator B. That is, the communication in the frequency band 25 is controlled by the eNodeB 21 of the operator B.

(Technique of Leasing Frequency Band)

As a technique of leasing a frequency band, a first technique (which will be referred to as "first leasing technique" below) causes an eNodeB of a lessee operator that has leased a leasehold frequency band to operate the frequency band. Meanwhile, as a technique of leasing a frequency band, a second technique (which will be referred to as "second leasing technique" below) causes an eNodeB of a lessor operator that has leased a leasehold frequency band to operate the frequency band. These leasing techniques will be described more specifically below with reference to FIGS. 3 and 4.

Figure 3:
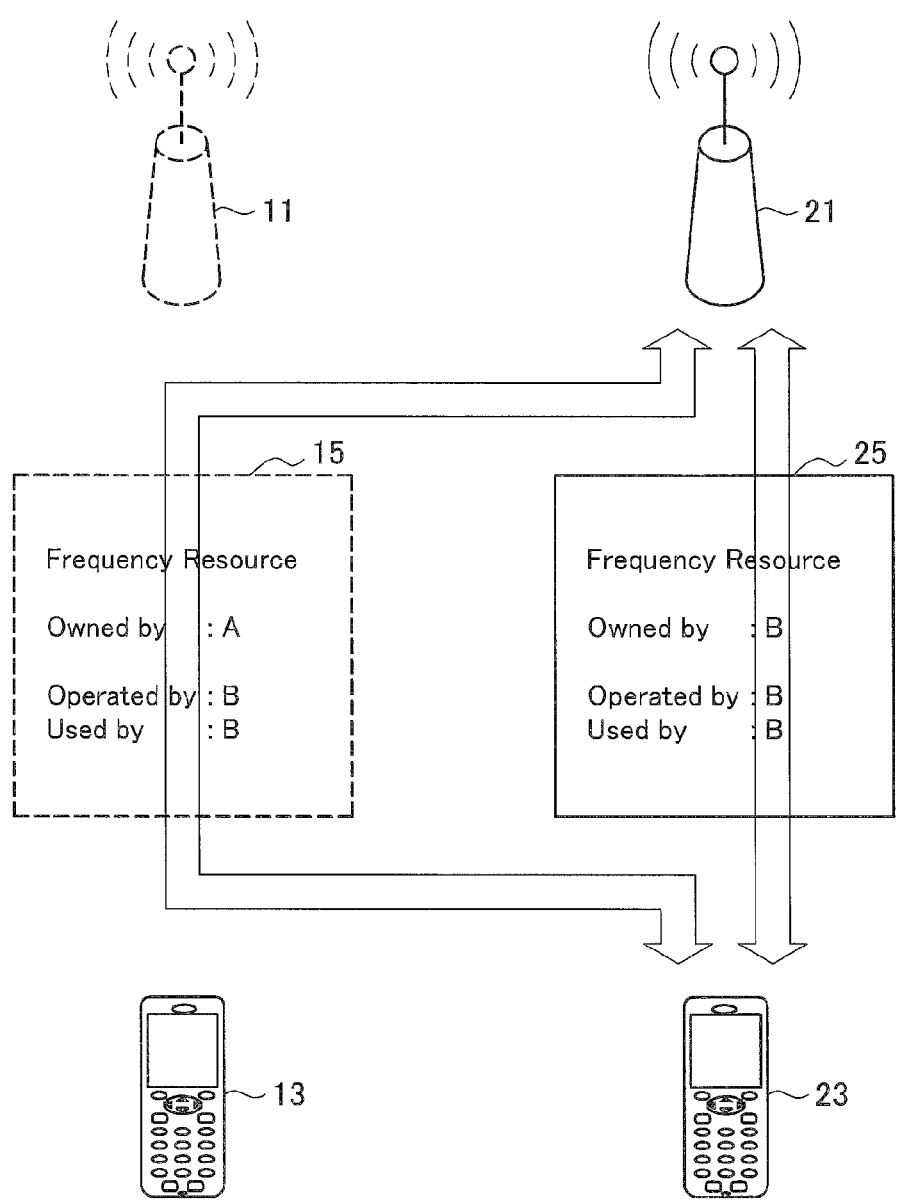
FIG. 3 is an explanatory diagram for describing a first leasing technique in which an eNodeB of a lessee operator that has leased a leasehold frequency band operates the frequency band.

FIG. 3 is an explanatory diagram for describing the first leasing technique in which an eNodeB of a lessee operator that has leased a leasehold frequency band operates the frequency band. As in FIG. 2, FIG. 3 illustrates the eNodeB 11 of the operator A, the eNodeB 21 of the operator B, the UE 13 of the operator A, and the UE 23 of the operator B. The operator A owns the frequency band 15, while the operator B owns the frequency band 25. Here, the frequency band 15 of the operator A is leased to the operator B. The frequency band 15 is thus used for the radio communication of the UE 23 of the operator B. The leased frequency band 15 is operated by the eNodeB 21 of the operator B, which has leased the frequency band 15. That is, the radio communication of the UE 23 in the frequency band 15 is controlled by the eNodeB 21 of the operator B, and the communication data in the radio communication passes through the eNodeB 21 of the operator B. That is, the first leasing technique leases only a frequency band.

Figure 4:
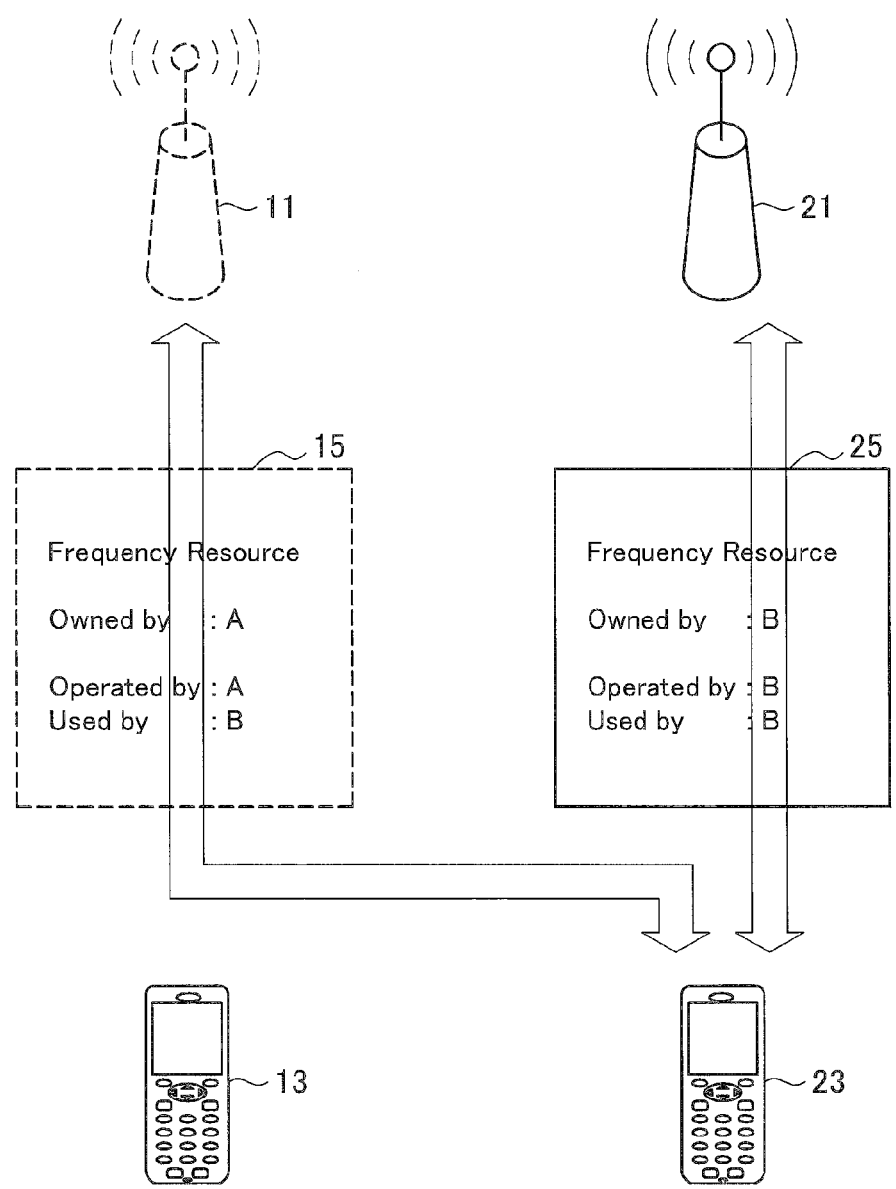
FIG. 4 is an explanatory diagram for describing a second leasing technique in which an eNodeB of a lessor operator that has leased a leasehold frequency band operates the frequency band.

FIG. 4 is an explanatory diagram for describing the second leasing technique of causing an eNodeB of a lessor operator that has leased a leasehold frequency band to operate the frequency band. The frequency band 15 of the operator A is also leased to the operator B. The frequency band 15 is thus used for the radio communication of the UE 23 of the operator B. The leased frequency band 15 is operated by the eNodeB 11 of the operator B, which has leased the frequency band 15. That is, the radio communication of the UE 23 in the frequency band 15 is controlled by the eNodeB 11 of the operator B, and communication data in the radio communication passes through the eNodeB 11 of the operator B. That is, the second leasing technique leases a frequency band, and causes the lessor to operate the frequency band.

(Leasehold Unit of Frequency Resource in Frequency Sharing)

Next, a unit of a frequency resource in the frequency sharing will be described. A component carrier unit, a resource block unit (i.e. unit of twelve consecutive subcarriers), and a subcarrier unit are conceivable as a leasehold unit of a frequency resource. Exchange of detailed information between operators is undesirable, so that lease in CC units seems the easiest.

The release 10 version of the 3rd generation partnership project (3GPP) specifications defines aggregation of up to five component carriers (CC) having a width of 20 MHz or carrier aggregation. For example, such a scenario is assumed on the premise of the carrier aggregation that a CC that is less frequently used among a plurality of CCs owned by an operator is leased to another operator. This point will be described more specifically below with reference to FIG. 5.

Figure 5:
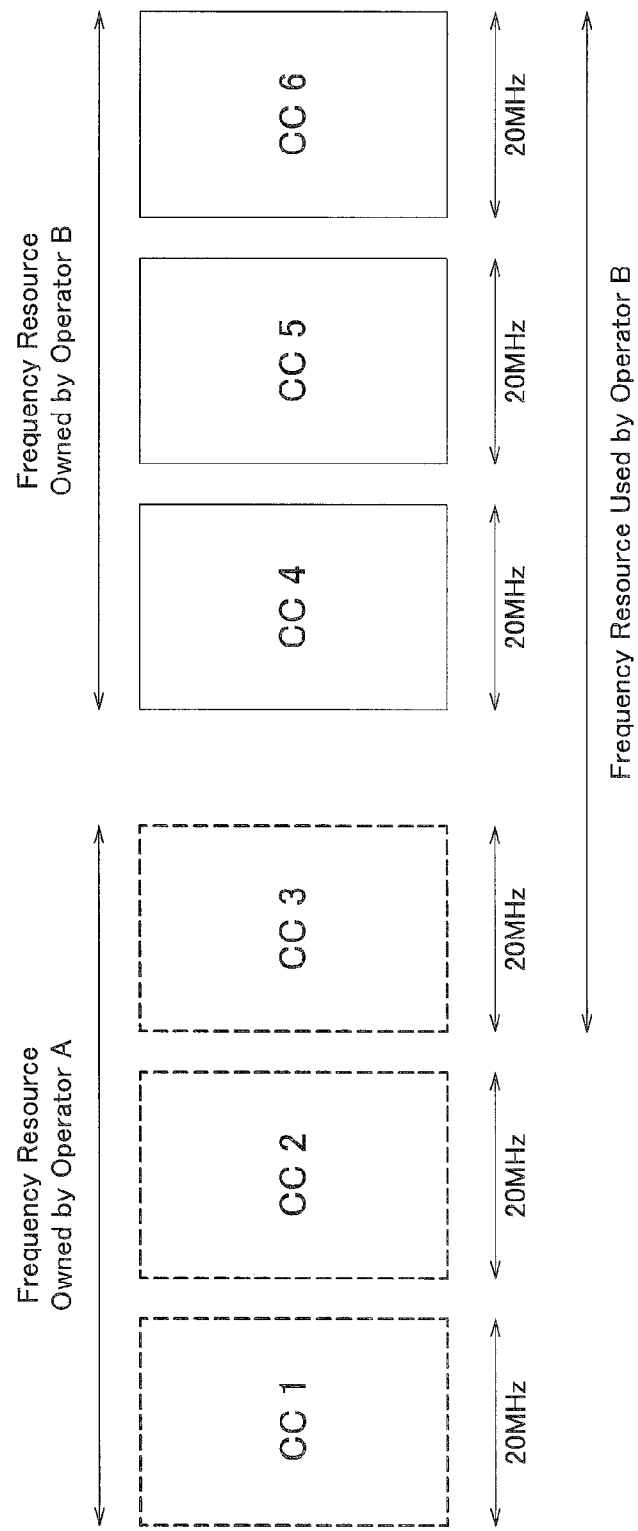
FIG. 5 is an explanatory diagram for describing an example of lease in component carrier units.

FIG. 5 is an explanatory diagram for describing an example of lease in component carrier units. FIG. 5 illustrates a CC 1, a CC 2, and a CC 3 owned by the operator A, and a CC 4, a CC 5, and a CC 6 owned by the operator B. For example, the CC 3 of the CCs owned by the operator A is leased to the operator B. As a result, the operator B (UE 23 of the operator B) uses the four CCs (CC3, CC4, CC5, and CC6).

(Handling of Leased Component Carrier)

When an operator leases a CC to another operator and the other operator (UE of the other operator) uses the CC, it is desirable that a UE of the operator cannot use the CC. For example, while the CC 3 is leased in the example of FIG. 5, it is desirable that the UE 13 of the operator A cannot use the CC 3. This is because when UEs belonging to different operators use one component carrier, various kinds of information need to be exchanged between a radio communication system of the operator A and a radio communication system of the operator B, which is undesirable.

(Frequency Sharing from Viewpoint of UE)

Basically speaking, a serving eNodeB of a UE is supposed to be one eNodeB of one operator. A system that makes a UE conscious of the existence of a plurality of operators seems undesirable because of complexity. It is thus desirable that a CC used seem to be owned by one operator from the viewpoint of a UE.

<1.3. Overview of Carrier Aggregation>

Next, the overview of the carrier aggregation will be described with reference to FIGS. 6 and 7.

First of all, component carriers (CCs) include primary component carriers (PCCs) and secondary component carriers (SCCs). A UE uses one PCC, and also uses one or more SCCs as necessary. The PCC of the UE does not have to be a particular CC. That is, the PCC of a UE may be a CC different from the PCC of another UE.

A PCC is a CC used for establishing a connection of a UE. That is, a UE uses any one of CCs for synchronization in a synchronization channel, identification of a cell, acquisition of basic information on a system in a broadcast channel (BCH), and control in a random access channel (RACH) to establish a connection. Any one of the CCs becomes a PCC. A SCC is a CC added to the PCC as necessary.

System information and synchronization signals are transmitted in both PCC and SCCs. The synchronization signals include a primary synchronization signal (PSS) and a secondary synchronization signal (SSS). This makes it possible to use CCs and communicate with a UE supporting the versions prior to the release 9 version of the 3GPP specifications. That is, backward compatibility is ensured.

When a SCC is added as a CC used by a UE in addition to the PCC, it is possible to issue a notification of system information of the SCC by signaling dedicated to the PCC.

PCCs can be changed. That is, a PCC can be changed from a CC to another CC. When a PCC is changed, an eNodeB decides for each UE which CC is desirable as the PCC. When PCCs are changed, a procedure for handover between frequencies is used. When SCCs are added, a UE is notified of system information of the SCCs to be added by signaling via PCCs. Accordingly, the quality of PCCs is important.

Linkage information on a downlink and an uplink is indicated in a system information block (SIB) 2 of system information. When there are a plurality of downlink CCs and a plurality of uplink CCs, linkage information indicates the linkage between the downlink CCs and the uplink CCs. That is, linkage information indicates which downlink CC is paired with which uplink CC.

As an arrangement pattern of physical downlink control channels (PDCCHs), which are control signals, a first pattern in which PDCCHs are present in the respective CCs and a second pattern in which some CCs have no PDCCHs are conceivable. The second pattern has so-called cross-carrier scheduling applied thereto. The first pattern does not have cross-carrier scheduling applied thereto, which is a normal pattern. This point will be described more specifically below with reference to FIGS. 6 and 7.

Figure 6:
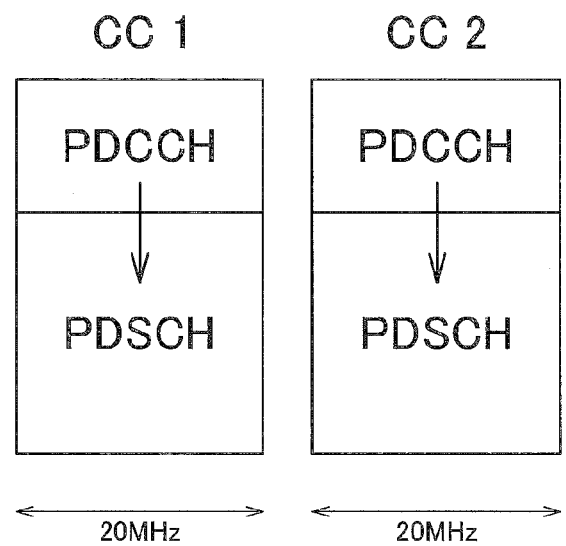
FIG. 6 is an explanatory diagram for describing an example of normally arranged PDCCHs.

FIG. 6 is an explanatory diagram for describing an example of normally arranged PDCCHs. FIG. 6 illustrates the CC 1 and the CC 2 owned by the operator A as illustrated in FIG. 5. Each of the CC 1 and the CC 2 has a PDCCH in this example. Scheduling information on each CC is transmitted in the PDCCH of the CC.

Figure 7:
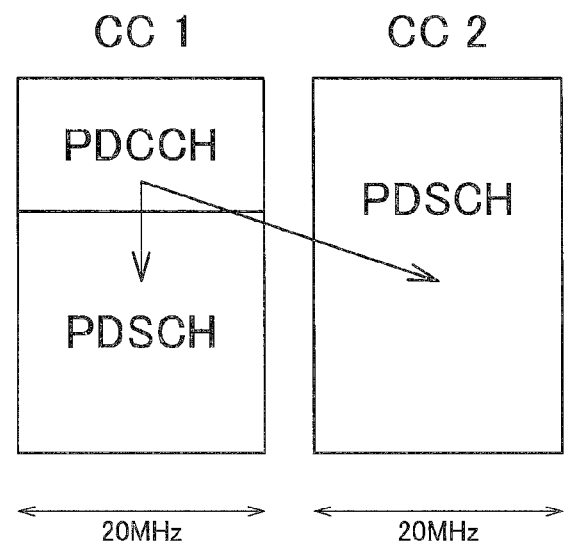
FIG. 7 is an explanatory diagram for describing an example of a PDCCH arranged when cross carrier scheduling is applied.

FIG. 7 is an explanatory diagram for describing an example of a PDCCH arranged when cross carrier scheduling is applied. The CC 1 has a PDCCH, and yet the CC 2 does not have any PDCCH in this example. Scheduling information on the CC 1 and the CC 2 is transmitted in the PDCCH of the CC 1.

The cross carrier scheduling as illustrated in FIG. 7 is an important technique for heterogeneous networks (Het-Nets) because CCs having PDCCHs can be alternate between an eNodeB for a macrocell and an eNodeB for a small cell, for example. The Het-Nets have a problem with interference of a PDCCH of an eNodeB for a macrocell with a PDCCH of an eNodeB for a small cell. Even when an eNodeB for a macrocell and an eNodeB for a small cell are both using the CC 1 and the CC 2, the interference between PDCCHs can be avoided by the eNodeB for the macrocell transmitting the PDCCH only in the CC 1 and by the eNodeB for the small cell transmitting the PDCCH in the CC 2, for example. This is referred to as Carrier Aggregation Based ICIC.

The concept of small cells includes femtocells, nanocells, picocells, microcells, and the like. Small cells are complementary cells for increasing the communication capacity of macrocells, and may be introduced by implementing eNodeBs smaller than eNodeBs for macrocells.

Cross carrier scheduling uses a 3-bit carrier indication field (CIF). The CIF may be quasi-statically set for each UE by radio resource control (RRC) signaling. Additionally, the RRC signaling means transmitting a control signal with a physical downlink shared channel (PDSCH).

Blind coding of PDCCHs has an upper limit in order to reduce the burdens on UEs. PCCs have an upper limit of 44 control channel elements (CCEs), while SCCs have an upper limit of 32 CCEs.

If PDCCHs and data do not arrived at UEs for a predetermined time, or if UEs are not allocated communication resources for a predetermined time, the UEs automatically deactivate SCCs. The predetermined times are set by eNodeBs.

This is the overview of the carrier aggregation in the release 10 version of the 3GPP specifications.

<1.4. Technical Problem>

A technical problem with implementation of the frequency sharing between different operators as discussed above will be described. It will be described as an example that the frequency sharing is implemented on a LTE-A platform to which the technique for the carrier aggregation in the release 10 version is applied.

As discussed above, the frequency band used by a UE in the carrier aggregation is a CC. A UE uses one or more CCs. More specifically, a UE uses one PCC as the primary frequency band, and also uses one or more SCCs as necessary as the secondary frequency bands. A CC is leased between different operators for the frequency sharing between the different operators, and the leased CC is then used by UEs as the PCC or the SCC. Here, the use of the leased CC as the PCC may make the processing by an eNodeB more complicated. It will be described below that the use of the second leasing technique (a frequency band is operated by an eNodeB of a lessor operator) illustrated in FIG. 4 and the use of the first leasing technique (a frequency band is operated by an eNodeB of a lessee operator) illustrated in FIG. 3 make the processing by the eNodeB more complicated.

(Use of Second Leasing Technique)

First of all, the use of the second leasing technique may make the processing by an eNodeB more complicated for transmitting a control signal from the eNodeB to a UE.

For example, when a CC used for the UE 23 of the operator B to establish a connection is a CC leased from the operator A, the UE 23 of the operator B uses only the CC leased from the operator A to wirelessly communicate with only the eNodeB 11 of the operator A. That is, the UE 23 of the operator B does not use a CC for communicating with the eNodeB 21 of the operator B, nor wirelessly communicate with the eNodeB 21 of the operator B. That is, the eNodeB 21 of the operator B cannot freely transmit a control signal to the UE 23 of the operator B, so that when the eNodeB 21 of the operator B transmits a control signal, the eNodeB 21 of the operator B asks the eNodeB 11 of the operator A to do so.

For example, when the UE 23 of the operator B uses a CC of the operator B as the SCC and uses a CC of the operator A as the PCC, the operator B transmits control information (e.g. system information of a SCC) by RRC signaling in the CC of the operator A. That is, the eNodeB 21 of the operator B asks the eNodeB 11 of the operator A to transmit a control signal.

As described above, when the second leasing technique is used, the use of a leased CC as the PCC causes information to be exchanged between the eNodeB 21 of the operator B and the eNodeB 11 of the operator A. In addition, the eNodeB 11 of the operator A needs to perform processing of transmitting a control signal to the UE 23 of the operator B. The use of the leased CC as the PCC thus makes the processing by an eNodeB more complicated.

(Use of First Leasing Technique)

The use of the first leasing technique may make the processing by an eNodeB more complicated after the lease of a frequency band is finished.

For example, when a CC of the operator A is leased to the operator B, the UE 23 of the operator B uses the leased CC to communicate with the eNodeB 21 of the operator B. Some of the UEs 23 use the leased CC as the PCC. After the lease of the CC from the operator A is finished, the UE 23 using the CC as the PCC needs frequency handover from the CC to another CC. Accordingly, every time the lease of a frequency band is finished, the eNodeB 21 performs the frequency handover for the UEs 23.

As described above, when the first leasing technique is used, the use of a leased CC as the PCC makes the processing by the eNodeB more complicated after the lease of a frequency band is finished.

An embodiment of the present disclosure can prevent the processing by a base station from becoming more complicated in the frequency sharing between different operators. The specific content will be described in <<2. First Embodiment>> and <<3. Second Embodiment>>.

<<2. First Embodiment>>

First of all, a first embodiment of the present disclosure will be described. The second leasing technique (a frequency band is operated by an eNodeB of a lessor operator) is used as a technique of leasing a frequency band in the first embodiment of the present disclosure. According to the first embodiment, a leased CC is not used by a UE as the PCC. As a result, the processing by a base station is prevented from becoming more complicated in the frequency sharing between different operators.

<2.1. Overview>

First of all, the overview of the first embodiment will be described with reference to FIG. 8.

Figure 8:
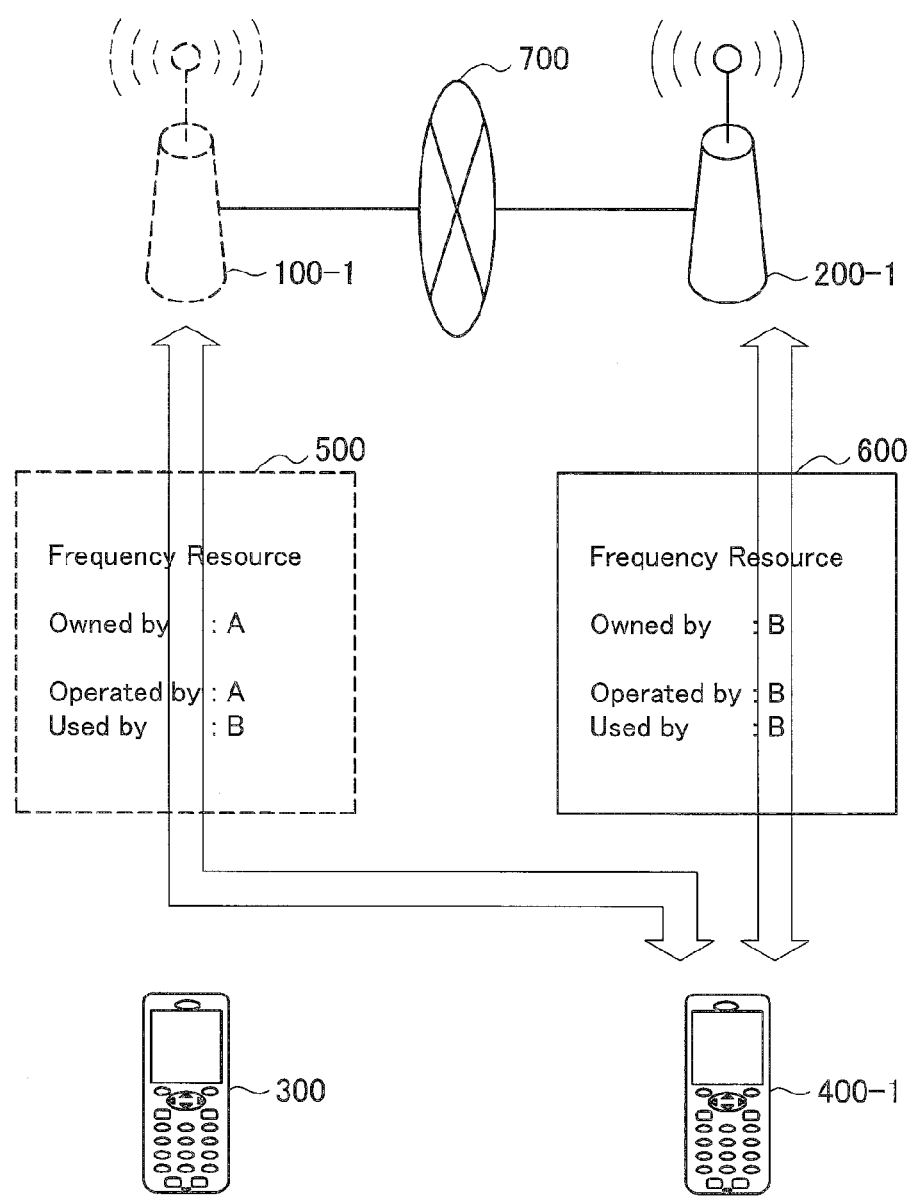
FIG. 8 is an explanatory diagram for describing an overview of a first embodiment.

FIG. 8 is an explanatory diagram for describing the overview of the first embodiment. FIG. 8 illustrates an eNodeB 100-1, a UE 300 and a frequency band 500 of the operator A, and an eNodeB 200-1, a UE 400-1 and a frequency band 600 of the operator B.

The frequency band 500 owned by the operator A is leased to the operator B in the present embodiment. The second leasing technique is used as a technique of leasing a frequency band in the present embodiment. That is, an eNodeB of a lessor operator that has leased a frequency band operates and uses the frequency band to communicate with a UE of a lessee operator that has leased the frequency band. As illustrated in FIG. 8, the UE 400-1 of the lessee operator B that has leased the frequency band thus uses the leased frequency band 500 to communicate with the eNodeB 100-1 of the operator A.

The UE 400-1 of the operator B also uses the frequency band 600 owned by the operator B to communicate with the eNodeB 100-1 of the operator B.

Additionally, each of the frequency band 500 and the frequency band 600 is, for example, a component carrier.

The eNodeB 200-1 of the operator A and the eNodeB 200-1 of the operator B communicate with each other via a network 700. The network 700 includes, for example, a core network of the operator A, a core network of the operator B, and a network that connects the two networks. These core networks are, for example, evolved packet cores (EPCs). The eNodeB 200-1 of the operator A and the eNodeB 200-1 of the operator B may directly communicate with each other, or may indirectly communicate with each other via the processing by a communication node.

Each of the eNodeB 100-1 of the lessor operator A and the eNodeB 200-1 of the lessee operator B performs control such that the frequency band 500 (CC) of the operator A is used by the UE 400-1 of the operator B as the primary frequency band (PCC) in the present embodiment.

When the frequency band 500 of the operator A is leased, the eNodeB 100-1 of the lessor operator A does not allow the frequency band 500 of the operator A to be used for the UE 400-1 of the operator B to establish a connection with the eNodeB 100-1. As discussed above, since the frequency band (CC) used for establishing a connection is the primary frequency band or the PCC, it is possible to prevent the frequency band 500 of the operator A from being the PCC for establishing a connection by preventing the frequency band 500 of the operator A from being used in this way.

The eNodeB 200-1 of the lessee operator B does not select the frequency band 500 of the operator A as the new PCC in the present embodiment when the primary frequency band or the PCC of the UE 400-1 of the operator B is changed. The PCC can be changed after a connection is established. Accordingly, the frequency band 500 of the operator A is not selected in this way when the PCC is changed, so that the frequency band 500 of the operator A is prevented from being the PCC after a connection is established.

A configuration, a procedure of processing, and a modified example of each apparatus according to the present embodiment will be described below in detail.

<2.2. Configuration of Lessor eNodeB>

Figure 9:
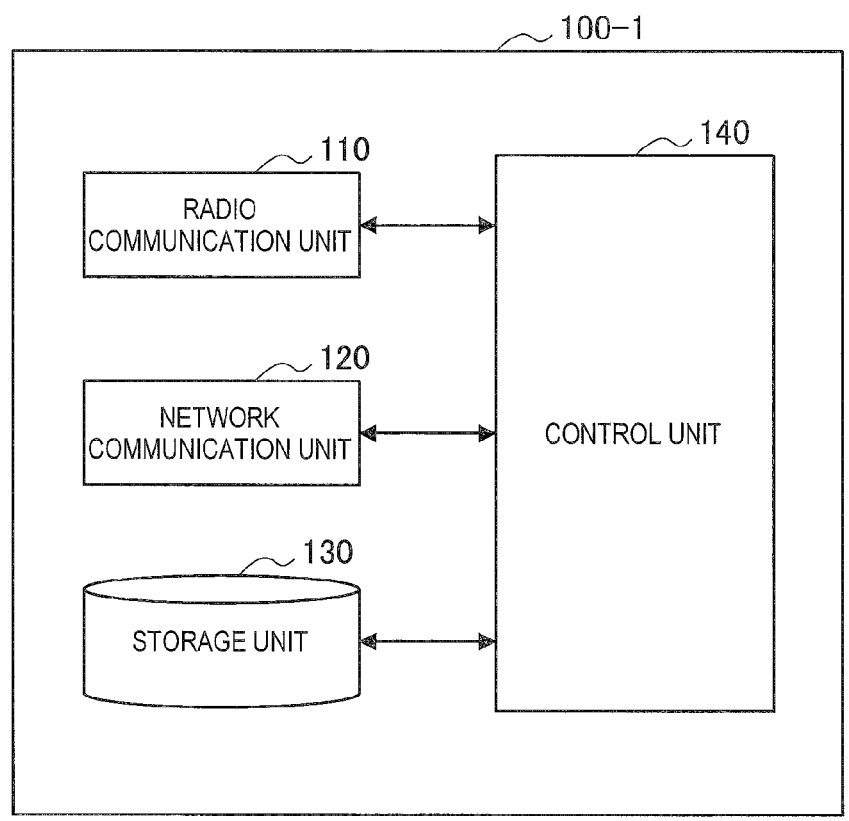
FIG. 9 is a block diagram illustrating an example of a configuration of a lessor eNodeB according to the first embodiment.

An example of a configuration of the eNodeB 100-1 (i.e. an eNodeB of the lessor operator A) according to the first embodiment will be described with reference to FIGS. 9 to 12. FIG. 9 is a block diagram illustrating the example of the configuration of the eNodeB 100-1 according to the first embodiment. FIG. 9 shows that the eNodeB 100-1 includes a radio communication unit 110, a network communication unit 120, a storage unit 130, and a control unit 140.

(Radio Communication Unit 110)

The radio communication unit 110 uses a frequency band to wirelessly communicate with a UE in the cell. The radio communication unit 110 includes, for example, an antenna and an RF circuit.

For example, the radio communication unit 110 wirelessly communicates with the UE 300, to which the operator A provides a service. More specifically, the radio communication unit 110 uses the frequency band 500 owned by the operator A in the cell of the eNodeB 100-1 to wirelessly communicate with the UE 300 of the operator A.

The radio communication unit 110 wirelessly communicates with the UE 400-1, to which the operator B provides a service. More specifically, when the frequency band 500 of the operator A is leased to the operator B, the radio communication unit 110 uses the frequency band 500 owned by the operator A in the cell of the eNodeB 100-1 to wirelessly communicate with the UE 400-1 of the operator B.

Additionally, the UE 300 of the operator A and the UE 400-1 of the operator B are capable of radio communication by using the one primary frequency band and the one or more secondary frequency bands. For example, the UE 300 and the UE 400-1 are UEs supporting the carrier aggregation, and are capable of radio communication by using the one PCC and the one or more SCCs.

(Network Communication Unit 120)

The network communication unit 120 communicates with another communication node. For example, the network communication unit 120 communicates with the eNodeB 200-1 of the operator B directly or via a communication node.

(Storage Unit 130)

The storage unit 130 stores a program and data for the operation of the eNodeB 100-1. The storage unit 130 includes, for example, a storage medium such as a hard disk and a semiconductor memory.

(Control Unit 140)

The control unit 140 provides a variety of functions of the eNodeB 100-1. For example, the control unit 140 corresponds to a processor such as a CPU and a DSP, and executes a program stored in the storage unit 130 or another storage medium to provide the variety of functions.

The control unit 140 controls the access of the UE 400-1 such that a frequency band 500 among the one or more frequency bands 500 owned by the operator A which is temporarily used by the operator B is not used as the one primary frequency band of the UE 400-1 of the operator B. More specifically, the control unit 140 does not, for example, arrange a synchronization signal in the frequency band 500 temporarily used by the operator B in a frequency direction which is searched for by the UE 400-1 of the operator B.

As a first example, the control unit 140 does not arrange a synchronization signal in a frequency band 500 among the one or more frequency bands 500 owned by the operator A which is temporarily used by the operator B. This point will be described more specifically below with reference to FIGS. 10 and 11.

Figure 10:
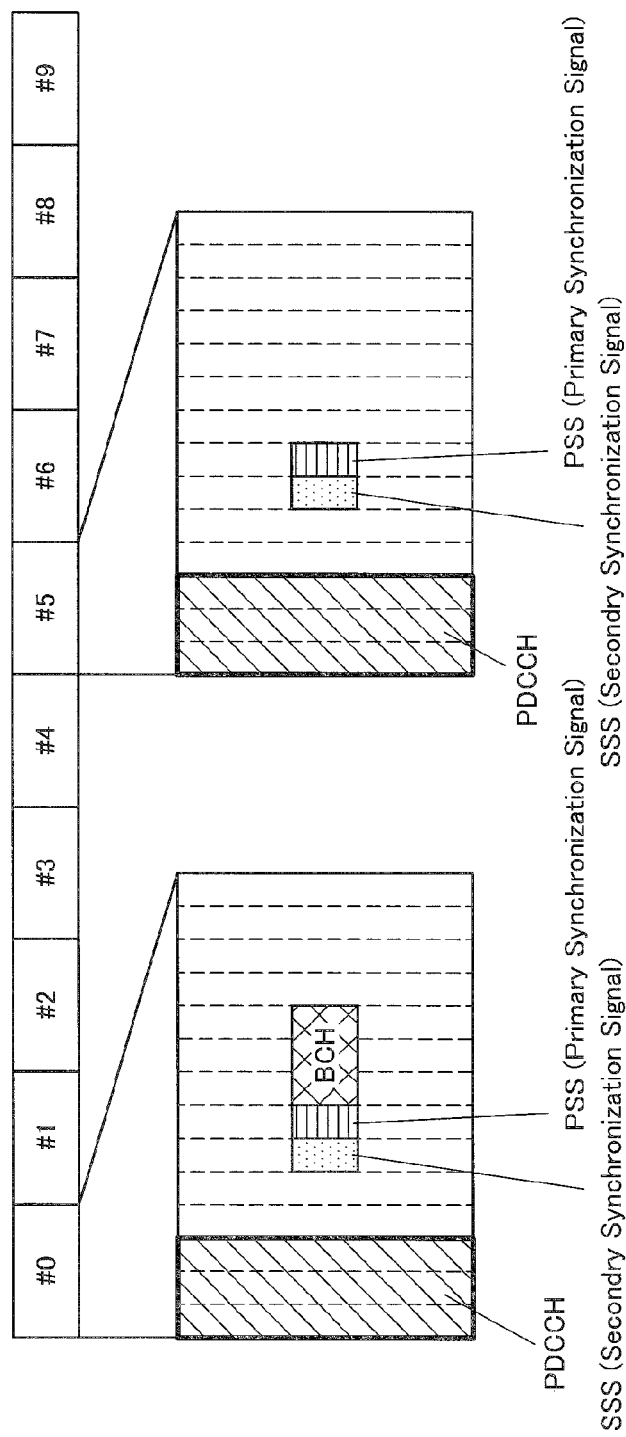
FIG. 10 is an explanatory diagram for describing an example of a normal radio frame including a synchronization signal.

FIG. 10 is an explanatory diagram for describing an example of a normal radio frame including a synchronization signal. FIG. 10 illustrates a radio frame including ten subframes numbered #0 to #9. Each subframe includes two slots each of which includes seven OFDM symbols. That is, each subframe includes 14 OFDM symbols. Synchronization signals PSS and SSS are arranged in the seventh and sixth OFDM symbols in the #0 and #5 subframes, respectively, in the time (t) direction. The synchronization signals PSS and SSS are arranged in the center of a frequency band in the frequency (f) direction. When the frequency band 500 owned by the operator A is not leased, the control unit 140, for example, arranges synchronization signals as illustrated in FIG. 10. Additionally, PDCCHs are arranged in the first to third OFDM symbols in the subframes, and broadcast channels (BCH) are arranged in OFDM symbols after the PSSs and SSSs.

Figure 11:
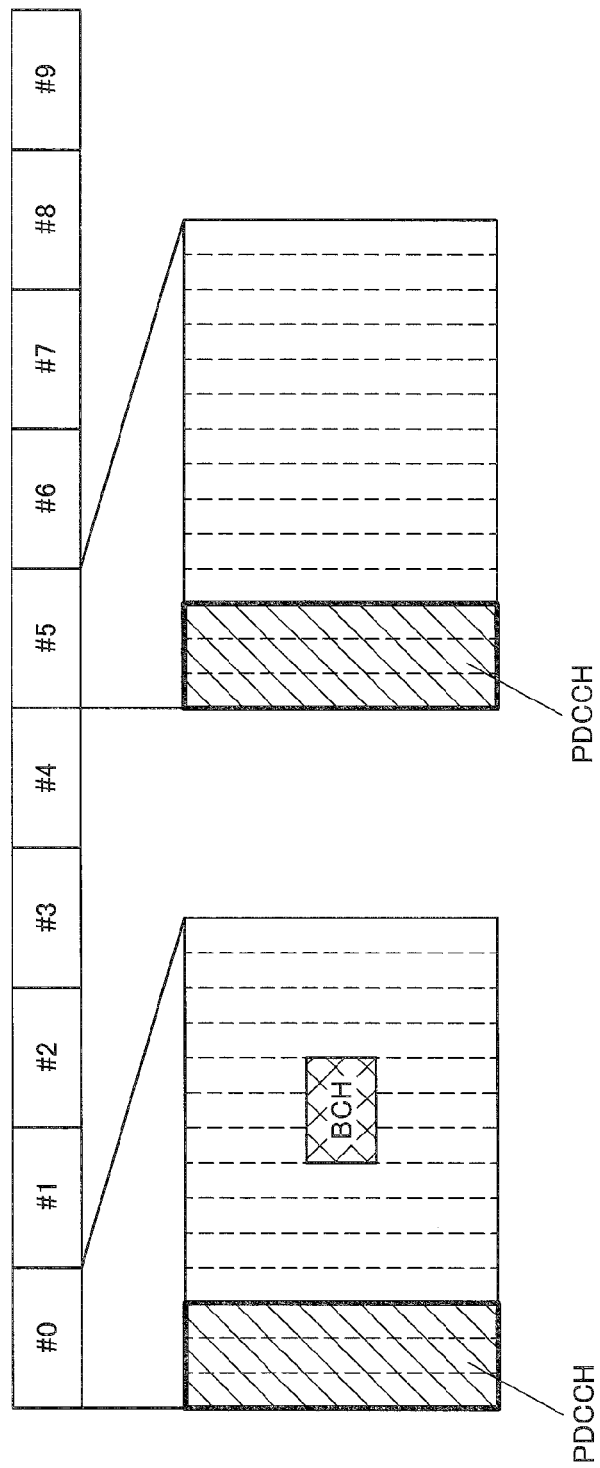
FIG. 11 is an explanatory diagram for describing an example of a radio frame including no synchronization signal.

FIG. 11 is an explanatory diagram for describing an example of a radio frame including no synchronization signal. Different from FIG. 10, FIG. 11 shows that no synchronization signal is arranged in the radio frame. When the frequency band 500 owned by the operator A is temporarily used by the operator B, or when the frequency band 500 is leased to the operator B, the control unit 140 does not, for example, arrange a synchronization signal as illustrated in FIG. 10.

No synchronization signal is arranged in a leased radio frame as illustrated in FIG. 11, so that the UE 400-1 of the operator B cannot perform synchronization by using the frequency band 500 leased from the operator A when a connection is established. That is, the UE 400-1 in an RRC Idle state cannot perform synchronization by using the PSS and the SSS in order to come into a radio resource control (RRC) Connected state when using the frequency band 500 leased from the operator A to do a cell search. Accordingly, the UE 400-1 of the operator B cannot use the frequency band 500 leased from the operator A to establish a connection. It is thus possible to prevent the leased frequency band 500 of the operator A from being the PCC when a connection is established.

Additionally, the frequency band 500 (CC) leased from the operator A may be used by the UE 400-1 of the operator B as the SCC. In this case, the UE 400-1 of the operator B can perform synchronization by using the SCC. This point will be discussed below in connection with the UE 400-1 of the operator B.

As a second example, the control unit 140 may shift the position of a synchronization signal in the frequency direction in a frequency band 500 among the one or more frequency bands owned by the operator A from the position in the frequency direction which is searched for by the UE 400-1 of the operator B, the frequency band 500 being temporarily used by the operator B. This point will be described more specifically below with reference to FIG. 12.

Figure 12:
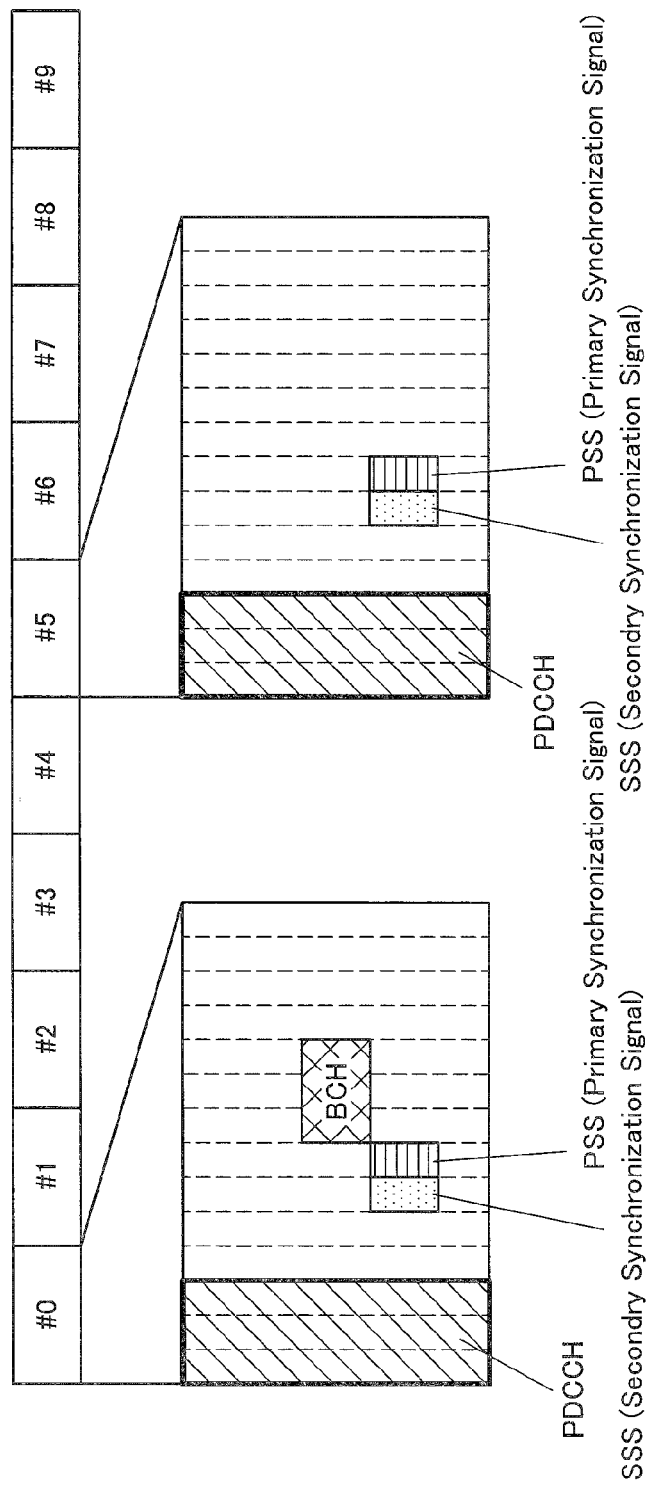
FIG. 12 is an explanatory diagram for describing an example of a radio frame including no synchronization signal.

FIG. 12 is an explanatory diagram for describing an example of a radio frame including no synchronization signal. Different from FIG. 10, FIG. 12 shows that synchronization signals are not arranged in the center of a frequency band in the radio frame. The positions of the synchronization signals in the frequency band are shifted from the positions (i.e. the center of the frequency band) in the frequency band which are searched for by a UE. When the frequency band 500 owned by the operator A is temporarily used by the operator B, or when the frequency band 500 is leased to the operator B, the control unit 140, for example, shifts the positions of the synchronization signals in the frequency direction as illustrated in FIG. 12.

No synchronization signal is arranged in a leased radio frame as illustrated in FIG. 12, so that the UE 400-1 of the operator B cannot perform synchronization in a frequency band leased from the operator A in establishing a connection (more specifically, in doing a cell search). Accordingly, the UE 400-1 of the operator B cannot use the frequency band 500 leased from the operator A when a connection is established. It is thus possible to prevent the leased frequency band 500 of the operator A from being the PCC when a connection is established. In addition, a UE can detect a synchronization signal and perform synchronization by searching for the shifted position.

Additionally, RRC signaling from an eNodeB, for example, explicitly notifies the UE 400-1 of the leased frequency band or a frequency band in which a synchronization signal is not arranged at a predetermined position in the frequency direction. Alternatively, when there is a frequency band (CC) in which synchronization failed to be performed, the UE 400-1 recognizes as a result of the cell search that the frequency band is a frequency band that has been leased.

<2.3. Configuration of Lessee eNodeB>

Figure 13:
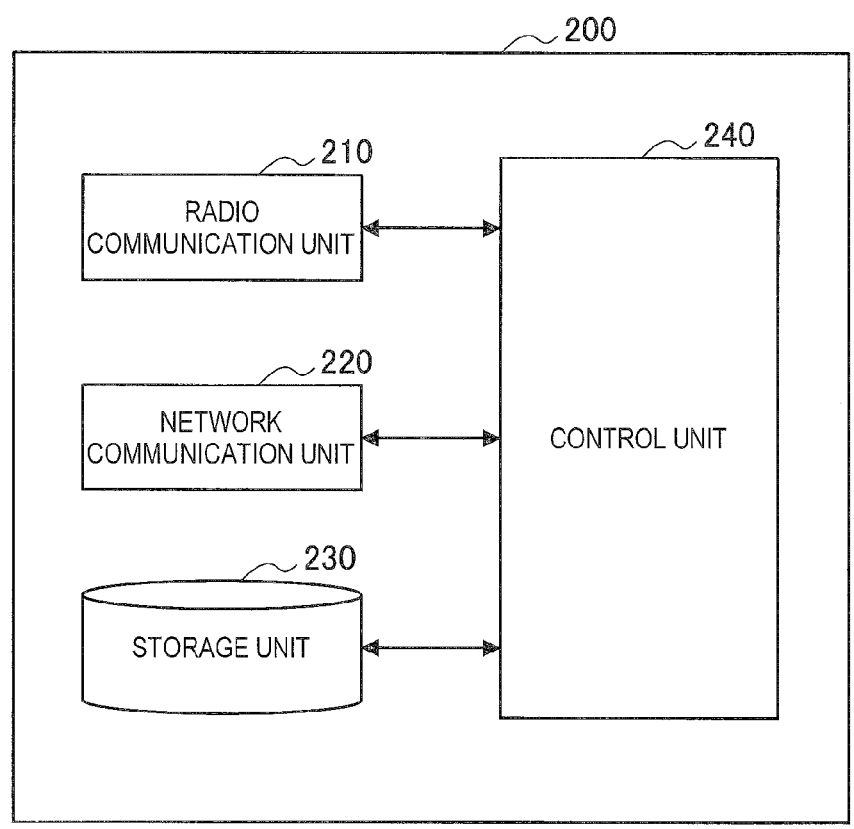
FIG. 13 is a block diagram illustrating an example of a configuration of a lessee eNodeB according to the first embodiment.

An example of a configuration of the eNodeB 200-1 (i.e. an eNodeB of the lessee operator B) according to the first embodiment will be described with reference to FIG. 13. FIG. 13 is a block diagram illustrating the example of the configuration of the eNodeB 200-1 according to the first embodiment. FIG. 13 shows that the eNodeB 200-1 includes a radio communication unit 210, a network communication unit 220, a storage unit 230, and a control unit 240.

(Radio Communication Unit 210)

The radio communication unit 210 uses a frequency band to wirelessly communicate with a UE in the cell. The radio communication unit 210 includes, for example, an antenna and an RF circuit.

For example, the radio communication unit 210 wirelessly communicates with the UE 400-1, to which the operator B provides a service. More specifically, the radio communication unit 210 uses the frequency band 600 owned by the operator B in the cell of the eNodeB 200-1 to wirelessly communicate with the UE 400-1 of the operator B.

(Network Communication Unit 220)

The network communication unit 220 communicates with another communication node. For example, the network communication unit 220 communicates with the eNodeB 100-1 of the operator A directly or via a communication node.

(Storage Unit 230)

The storage unit 230 stores a program and data for the operation of the eNodeB 200-1. The storage unit 230 includes, for example, a storage medium such as a hard disk and a semiconductor memory.

(Control Unit 240)

The control unit 240 provides a variety of functions of the eNodeB 200-1. For example, the control unit 240 corresponds to a processor such as a CPU and a DSP, and executes a program stored in the storage unit 230 or another storage medium to provide the variety of functions.

The control unit 240 controls the access of the UE 400-1 such that a frequency band 500 among the one or more frequency bands 500 owned by the operator A which is temporarily used by the operator B is not used as the one primary frequency band of the UE 400-1 of the operator B. More specifically, when the one primary frequency band used by the UE 400-1 of the operator B is changed, the control unit 240 does not, for example, select the frequency band 500 temporarily used by the operator B as the one primary frequency band. That is, when the PCC of the UE 400-1 is changed, the control unit 240 does not select a CC leased to the operator B as the new PCC. As discussed above, the PCC can be changed. When the PCC is changed, an eNodeB selects the new PCC on the basis of a measurement result of each CC of each UE. If the leased CC is not selected as the PCC when the PCC is changed in this way, it is possible to prevent the leased frequency band 500 of the operator A from being the PCC after a connection is established.

<2.4. Configuration of Lessee UE>

Figure 14:
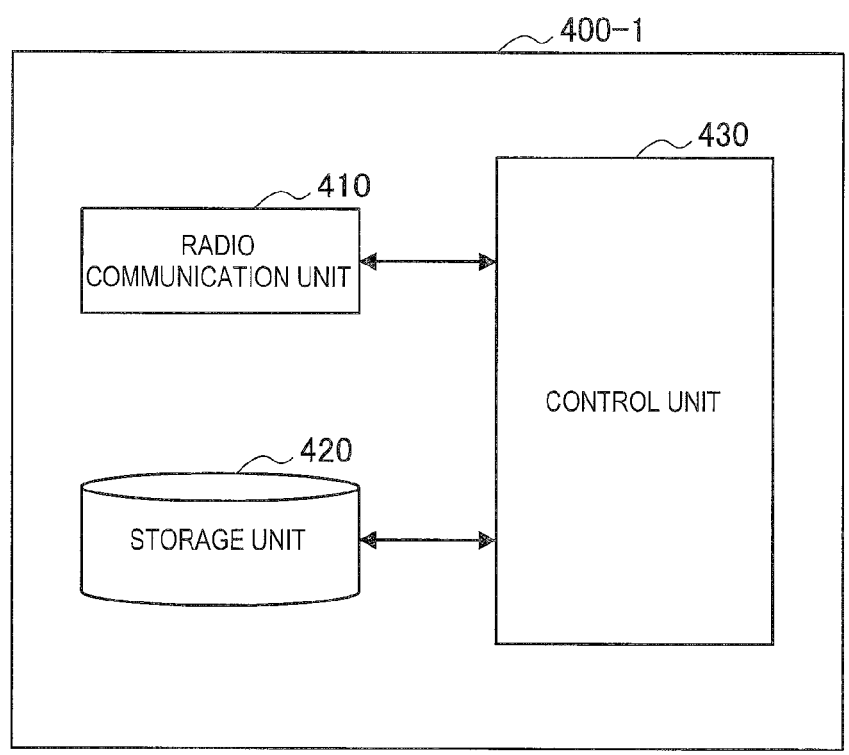
FIG. 14 is a block diagram illustrating an example of a configuration of a lessee UE according to the first embodiment.

An example of a configuration of the UE 400-1 (i.e. an eNodeB of the lessee operator B) according to the first embodiment will be described with reference to FIG. 14. FIG. 14 is a block diagram illustrating the example of the configuration of the UE 400-1 according to the first embodiment. FIG. 14 shows that the UE 400-1 includes a radio communication unit 410, a storage unit 420, and a control unit 430.

(Radio Communication Unit 410)

The radio communication unit 410 uses a frequency band to wirelessly communicate with an eNodeB. The radio communication unit 410 includes, for example, an antenna and an RF circuit.

For example, the radio communication unit 410 wirelessly communicates with the eNodeB 200-1 of the operator B. More specifically, the radio communication unit 410 uses the frequency band 600 owned by the operator B in the cell of the eNodeB 200-1 to wirelessly communicate with the eNodeB 200-1.

The radio communication unit 410 wirelessly communicates with the eNodeB 100-1 of the operator A. More specifically, when the frequency band 500 of the operator A is leased to the operator B, the radio communication unit 410 uses the frequency band 500 owned by the operator A in the cell of the eNodeB 100-1 to wirelessly communicate with the eNodeB 100-1 of the operator A.

Additionally, the radio communication unit 410 can wirelessly communicate with a base station by using the one primary frequency band and the one or more secondary frequency bands. For example, the UE 400-1 is a UE supporting the carrier aggregation, and is capable of radio communication by using the one PCC and the one or more SCCs.

(Storage Unit 420)

The storage unit 420 stores a program and data for the operation of the UE 400-1. The storage unit 420 includes, for example, a storage medium such as a hard disk and a semiconductor memory.

(Control Unit 430)

The control unit 430 provides a variety of functions of the UE 400-1. For example, the control unit 430 corresponds to a processor such as a CPU and a DSP, and executes a program stored in the storage unit 420 or another storage medium to provide the variety of functions.

For example, when no synchronization signal is arranged at a position in the frequency direction which is searched by the UE 400-1 of the operator B in the frequency band 500 temporarily used by the operator B, the use of the frequency band 500 as a secondary frequency band of the UE 400-1 causes the control unit 430 to perform synchronization in the frequency band 500 without using a synchronization signal at the position in the frequency direction.

As a first example, no synchronization signal is arranged in a frequency band 500 among the one or more frequency bands 500 owned by the operator A, the frequency band 500 being temporarily used by the operator B. The frequency band 500 (CC) leased from the operator A may be used by the UE 400-1 of the operator B as the SCC. In this case, the UE 400-1 of the operator B can perform synchronization in the SCC. Specifically, if the frequency band 600 (CC) used as the PCC is near the frequency band 500 used as the SCC in the frequency direction, the UE 400-1 of the operator B can also perform synchronization in the SCC by taking advantage of the synchronization in the PCC. Even if the frequency band 600 used as the PCC is far from the frequency band 500 used as the SCC in the frequency direction, the UE 400-1 of the operator B can perform synchronization in the SCC. Specifically, the UE 400-1 of the operator B uses the synchronization in the PCC to perform synchronization in the SCC with some degree of accuracy, and then tracks a Cell Specific Reference Signal unique to the cell in the SCC, so that the UE 400-1 of the operator B can update the synchronization.

As a second example, the position of a synchronization signal in the frequency direction in a frequency band 500 among the one or more frequency bands 500 owned by the operator A which is temporarily used by the operator B is shifted from the position in the frequency direction which is searched for by the UE 400-1 of the operator B. The frequency band 500 (CC) leased from the operator A may be used by the UE 400-1 of the operator B as the SCC. In this case, the UE 400-1 of the operator B can detect a synchronization signal at the shifted position of the synchronization signal in the frequency direction, so that the UE 400-1 of the operator B can perform synchronization.

<2.5. Procedure of Processing>

Next, an example of processing according to the first embodiment will be described with reference to FIGS. 15 and 16, the processing being for preventing a leased frequency band from being used as the PCC.

(Processing for Establishing Connection)

Figure 15:
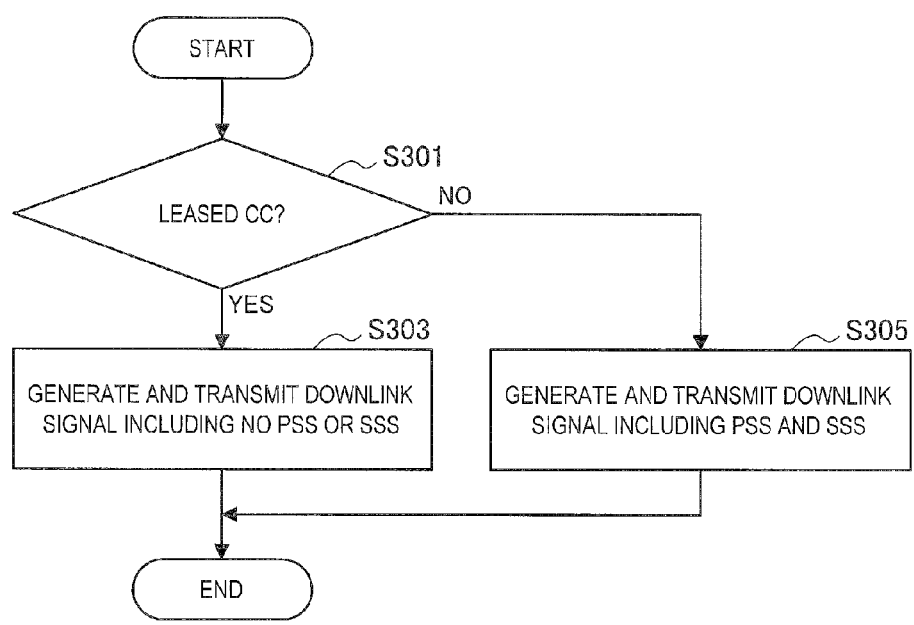
FIG. 15 is a flowchart illustrating an example of processing by a lessor eNodeB according to the first embodiment for generating a downlink signal.

FIG. 15 is a flowchart illustrating an example of processing of the lessor eNodeB 100-1 according to the first embodiment for generating a downlink signal. The processing is for preventing the frequency band 500 leased from the operator A from being used as the PCC when a connection is established for the UE 400-1 of the operator B.

First of all, the control unit 140 determines, in step S301, whether a target CC is the frequency band (CC) 500 leased from the operator A. If the CC is the leased CC, the processing proceeds to step S303. If not, the processing proceeds to step S305.

In step S303, the control unit 140 causes the radio communication unit 110 to generate and transmit a downlink signal including no PSS or SSS. The processing is then finished.

In step S305, the control unit 140 causes the radio communication unit 110 to generate and transmit a downlink signal including a PSS and an SSS. The processing is then finished.

(Processing after Connection is Established)

Figure 16:
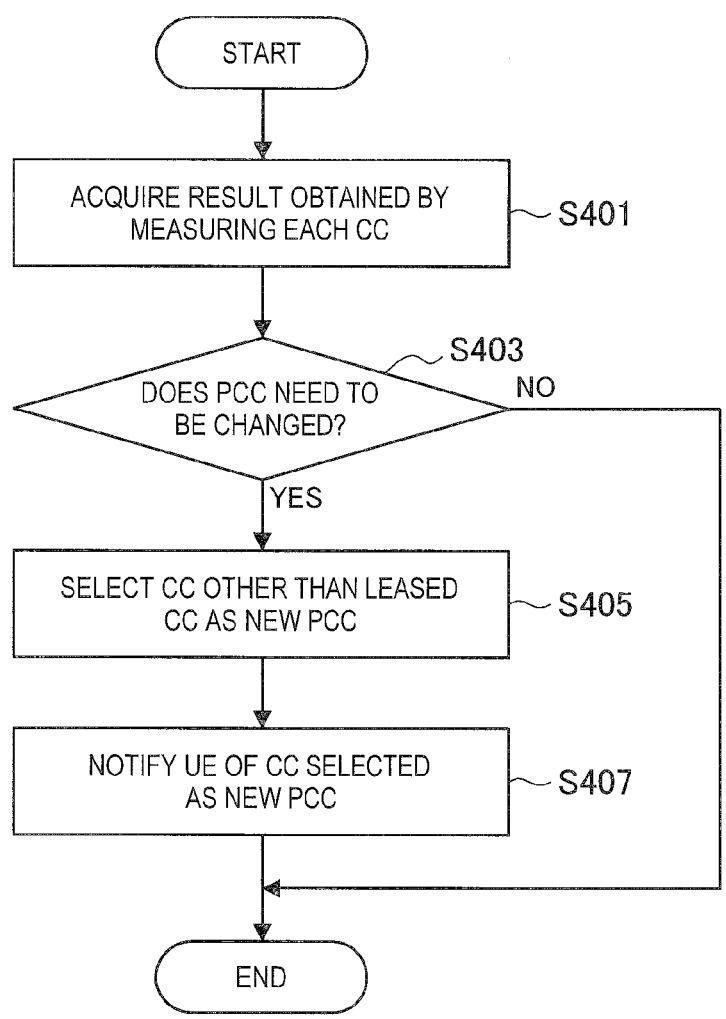
FIG. 16 is a flowchart illustrating an example of processing by a lessee eNodeB according to the first embodiment for changing a PCC.

FIG. 16 is a flowchart illustrating an example of processing of the lessee eNodeB 200-1 according to the first embodiment for changing a PCC. The processing is for preventing the frequency band 500 leased from the operator A from being used as the PCC after a connection is established for the UE 400-1 of the operator B.

First of all, the control unit 240 acquires, in step S401, a result obtained by measuring each CC for the UE 400-1. The control unit 240 then determines whether the PCC needs to be changed. If the PCC needs to be changed, the processing proceeds to step S405. If not, the processing is finished.

The control unit 240 selects, in step S405, a frequency band (CC) other than the frequency band (CC) 500 as the new PCC. In step S407, the control unit 240 then notifies the UE 400-1 of the frequency band (CC) selected as the new PCC. The processing is then finished.

<2.6. First Modified Example>

Next, a first modified example of the first embodiment will be described. The arrangement of a synchronization signal in a leased frequency band is changed in the first modified example, and yet a notification is issued to indicate that connection establishment (i.e. new access) is barred in system information of the leased frequency band instead.

(Configuration of eNodeB 100-1)

The control unit 140 notifies the UE 400-1 that the UE 400-1 is barred from establishing a new connection by using the frequency band 500 temporarily used by the operator B as the one primary frequency band. More specifically, information on conditional access barring is newly defined in system information. The conditional access barring, for example, indicates that UE 400-1 cannot use a CC in order to establish a new connection with the eNodeB 100-1, but can use the CC for other purposes. That is, the conditional access barring indicates that the UE 400-1 cannot use a CC when using the CC as the PCC, but can use the CC when using the CC as the SCC.

The conditional access barring is, for example, enabled when a frequency band (CC) is leased, while the conditional access barring is disabled when a frequency band (CC) is not leased.

As discussed above, a notification is issued in system information to indicate that connection establishment using the leased frequency band 500 is barred, so that the UE 400-1 of the operator B does not establish a connection in the frequency band 500 leased from the operator A. That is, the UE 400-1 in the RRC Idle state is synchronized by using a synchronization signal, and then confirms the barring in the system information of the frequency band 500 in order to come into the radio resource control (RRC) Connected state. As a result, the UE 400-1 stops establishing a connection in the frequency band 500 leased from the operator A. It is thus possible to prevent the leased frequency band 500 of the operator A from being the PCC when a connection is established.

(Procedure of Processing)

Figure 17:
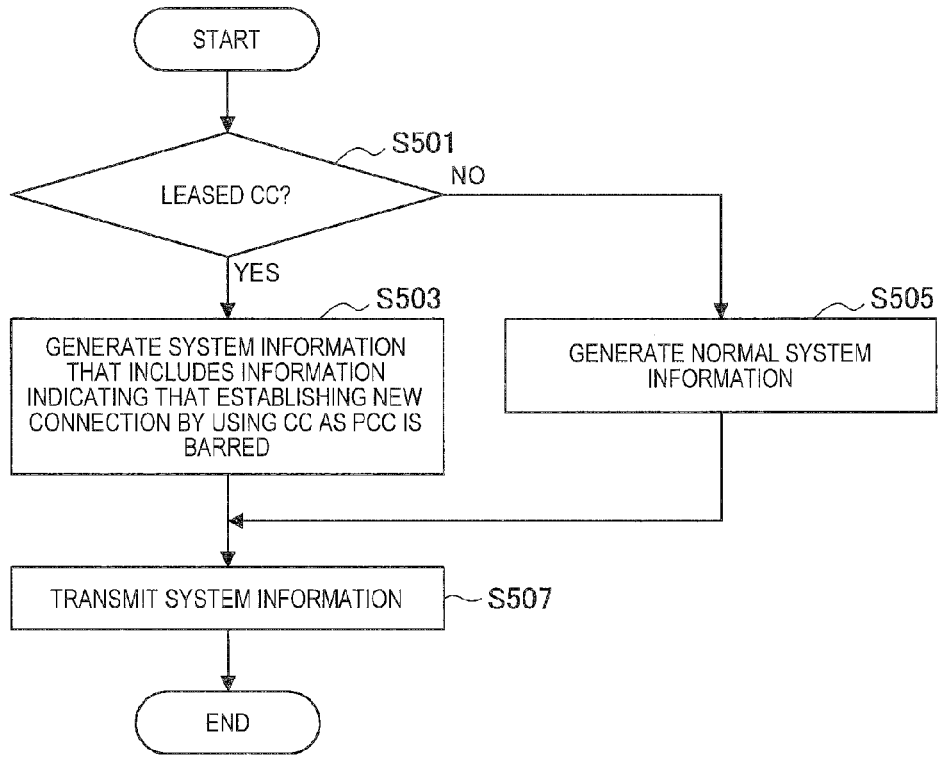
FIG. 17 is a flowchart illustrating an example of processing by a lessor eNodeB according to a first modified example for generating and transmitting system information.

Next, an example of processing according to the first modified example will be described with reference to FIG. 17, the processing being for preventing a leased frequency band from being used as the PCC when a connection is established. FIG. 17 is a flowchart illustrating an example of processing of the lessor eNodeB 100-1 according to the first modified example for generating and transmitting system information.

First of all, the control unit 140 determines, in step S501, whether a target CC is the frequency band (CC) 500 leased from the operator A. If the CC is the leased CC, the processing proceeds to step S503. If not, the processing proceeds to step S505.

First of all, the control unit 140 generates, in step S503, system information that includes information indicating that new connection establishment by using the CC as the PCC is barred (i.e. conditional access barring).

The control unit 140 generates, in step S505, normal system information.

In step S507, the control unit 140 then transmits the generated system information via the radio communication unit 110.

<2.7. Second Modified Example>

Next, a second modified example of the first embodiment will be described. When the frequency band 500 leased from the operator A is used by the operator B, the link direction of the frequency band 500 is limited in the second modified example.

(Technical Problem)

A notification of linkage information is issued in a SIB2 in system information of a downlink CC in the carrier aggregation in order to explicitly indicate the linkage between the downlink CC and an uplink CC that is paired with the downlink CC. A UE can identify the uplink CC that is paired with the downlink CC by receiving the linkage information on the downlink CC.

Concerning the UE 400-1 of the operator B, for example, a downlink CC may be the frequency band (CC) 500 leased from the operator A, while an uplink CC that is paired with the downlink CC may be the frequency band (CC) 600 owned by the operator B. In this case, linkage information needs to be included in system information of the frequency band 500 or the downlink CC of the operator A, the linkage information indicating the linkage with the frequency band 600 owned by the operator B. As a result, a procedure for the operator B to send the linkage information is also complicated. Accordingly, it is not desirable to use the leased frequency band 500 of the operator A as a downlink CC of the UE 400-1

(Overview of Second Modified Example)

Accordingly, the frequency band temporarily used by the operator B is used on an uplink. Alternatively, the frequency band temporarily used by the operator B is used on a downlink in a pair with another frequency band 500 among the one or more frequency bands 500 owned by the operator A, the other frequency band 500 being temporarily used by the operator B on an uplink.

Limiting the link direction in this way prevents the leased frequency band 500 from being paired with the frequency band 600 that is an uplink CC. There is thus no need to transmit linkage information in the leased frequency band 500, the linkage information indicating the linkage with the frequency band 600 that is an uplink CC. Accordingly, it is possible to prevent the procedure for the operator B to send linkage information from becoming more complicated.

(Configuration of eNodeB 100-1)

The radio communication unit 110 uses the frequency band 500 temporarily used by the operator B for an uplink. Alternatively, the radio communication unit 110 uses the frequency band 500 temporarily used by the operator B in a pair with another frequency band 500 among the one or more frequency bands 500 owned by the operator A, the other frequency band 500 being temporarily used by the operator B on an uplink.

Additionally, the link direction of the frequency band 500 temporarily used by the operator B, or the link direction of the leased frequency band 500 is decided by a communication node. The link direction may be, for example, decided by the lessee eNodeB 200-1, or the lessor eNodeB 100-1. Alternatively, a communication node which has decided that the frequency band 500 is leased may also decide the link direction.

(Procedure of Processing)

Figure 18:
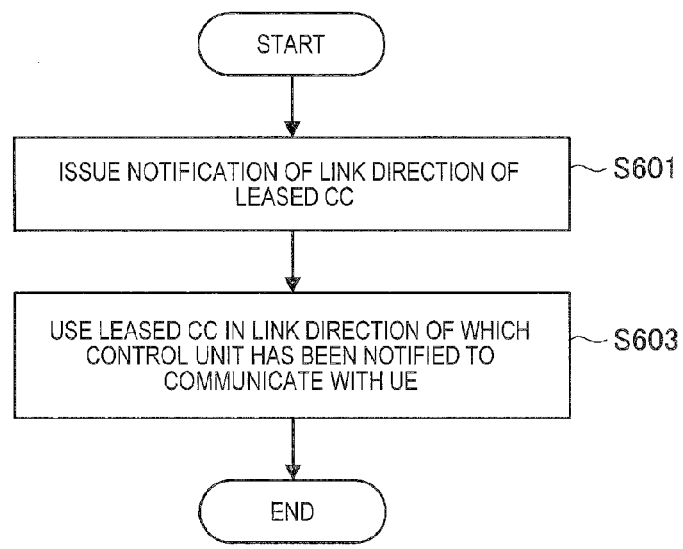
FIG. 18 is a flowchart illustrating an example of communication processing by a lessor eNodeB according to a second modified example by use of a leased frequency band.

Next, an example of communication processing of the lessor eNodeB 100-1 according to the second modified example by use of the leased frequency band 500 will be described with reference to FIG. 18. FIG. 18 is a flowchart illustrating the example of the communication processing of the lessor eNodeB 100-1 according to the second modified example by use of the leased frequency band 500.

First of all, after it is decided that the frequency band (CC) 500 of the operator B is leased, the control unit 140 is, in step S601, notified of the link direction of the leased frequency band 500 via the network communication unit 120. For example, the control unit 140 is notified of the link direction by the lessee eNodeB 200-1.

Next, the radio communication unit 110 uses, in step S603, the leased frequency band 500 in the link direction of which the control unit 140 has been notified to communicate with the UE 400-1.

<2.8. Third Modified Example>

Next, a first modified example of a third embodiment will be described. Like the second modified example, the link direction of a leased frequency band is limited, and yet linkage information is transmitted using a lessee frequency band in a third modified example instead.

(Overview of Third Modified Example)

For example, the frequency band 500 temporarily used by the operator B is used on a downlink in a pair with another frequency band that is not owned by the operator A, but used by the operator B on an uplink. In this case, the UE 400-1 is notified in the frequency band 600 owned by the operator B of information indicating the linkage between the frequency band 500 used on the downlink and the other frequency band used on the uplink.

More specifically, the other frequency band is the frequency band 600 owned by the operator B, and used by the operator B on the uplink. The frequency band 500 temporarily used by the operator B is used on the downlink in a pair with the frequency band 600 used by the operator B on the uplink. In this case, the UE 400-1 is notified in the frequency band 600 of the operator B of linkage information indicating the linkage between the frequency band 500 used on the downlink and the frequency band 600 used on the uplink. As an example, the UE 400-1 is notified of the linkage information by RRC signaling in the frequency band 600, which is used as the PCC.

A notification of linkage information is issued in this way, so that a notification of linkage information does not need to be issued in system information of the frequency band 500 even if the leased frequency band 500 is used as a downlink CC and the frequency band 600 is used as an uplink CC. Accordingly, it is possible to prevent the procedure for the operator B to send linkage information from becoming more complicated.

(Configuration of eNodeB 200-1)

For example, the frequency band 500 temporarily used by the operator B is used on a downlink in a pair with another frequency band that is not owned by the operator A, but used by the operator B on an uplink. In this case, the control unit 240 notifies the UE 400-1 in the frequency band 600 owned by the operator B of information indicating the linkage between the frequency band 500 used on the downlink and the other frequency band used on the uplink.

(Procedure of Processing)

Figure 19:
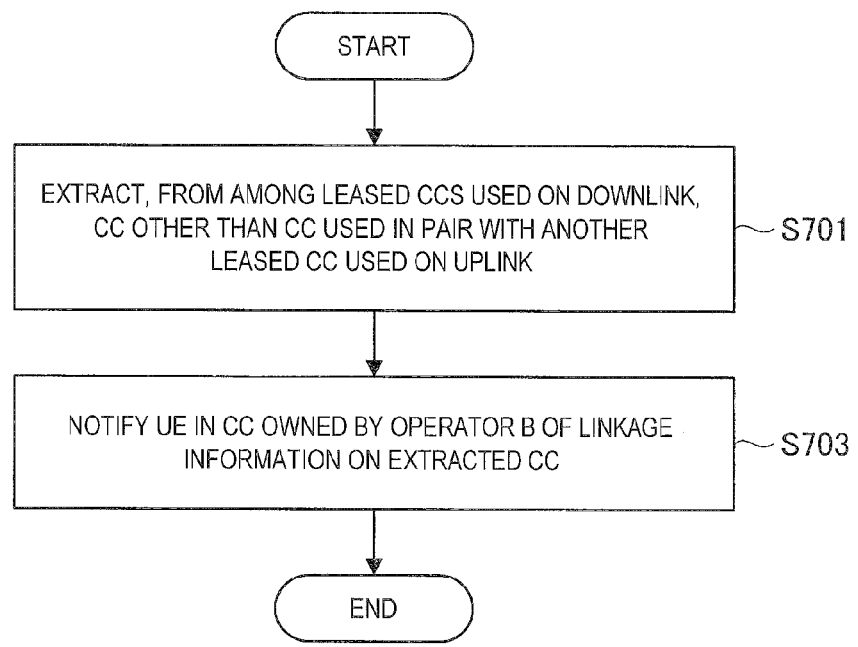
FIG. 19 is a flowchart illustrating an example of processing by a lessee eNodeB according to a third modified example for issuing a notification of linkage information.

Next, an example of processing of the lessee eNodeB 200-1 according to the third modified example for issuing a notification of linkage information will be described with reference to FIG. 19. FIG. 19 is a flowchart illustrating an example of the processing of the lessee eNodeB 200-1 according to the third modified example for issuing a notification of linkage information.

First of all, the control unit 240 extracts, in step S701, from among the leased frequency bands (CCs) 500 used on a downlink, a frequency band 500 other than the frequency band 500, which is used in a pair with another leased frequency band 500 used on an uplink.

Next, the control unit 240 notifies, in step S703, the UE 400-1 in the frequency band (CC) 600 owned by the operator B of linkage information on the extracted frequency band (CC) 500.

<2.9. Fourth Modified Example>

Next, a fourth modified example of the first embodiment will be described. When cross carrier scheduling is used, the UE 400-1 is notified of scheduling information on the leased frequency band 500 of the operator A in the frequency band 600 of the lessee operator B in the fourth modified example.

(Technical Problem)

When cross carrier scheduling is used, a CIF in a PDCCH in a downlink CC is used to designate another downlink CC, so that scheduling is performed. For example, a CIF in the leased frequency band (CC) 500 of the operator A is used to designate the frequency band (CC) 600 owned by the operator B. In this case, the eNodeB 100-1 of the operator A transmits scheduling information on the frequency band 600 of the operator B in a PDCCH in the frequency band 500 of the operator A. Accordingly, this leads to an increase in burdens on the eNodeB 100-1 of the lessor operator A.

(Overview of Fourth Modified Example)

Accordingly, when the frequency band 500 temporarily used by the operator B is used as a downlink frequency band, a notification of scheduling information on a frequency band owned by the operator B is not issued in the frequency band 500. That is, even if cross carrier scheduling is used, a notification of scheduling information on the frequency band 600 of the operator B is not issued in a PDCCH in the leased frequency band 500.

Notification of scheduling information in this way can reduce burdens on the eNodeB 100-1 of the lessor operator A even if cross carrier scheduling is used.

Additionally, a notification of scheduling information on the leased frequency band 500 may be issued in a PDCCH in the frequency band 600 of the operator B. In this case, scheduling information on the frequency band 500 is, for example, transmitted from the eNodeB 100-1 of the operator A to the eNodeB 200-1 of the operator B.

(Configuration of eNodeB 100-1)

The frequency band 500 temporarily used by the operator B is used as a downlink frequency band. In this case, the control unit 140 does not issue a notification of scheduling information on the frequency band 600 owned by the operator B in the frequency band 500.

(Configuration of eNodeB 200-1)

The control unit 240 issues a notification of scheduling information on the frequency band 600 owned by the operator B in the frequency band 600 or another frequency band 600 owned by the operator B.

(Procedure of Processing)

Figure 20:
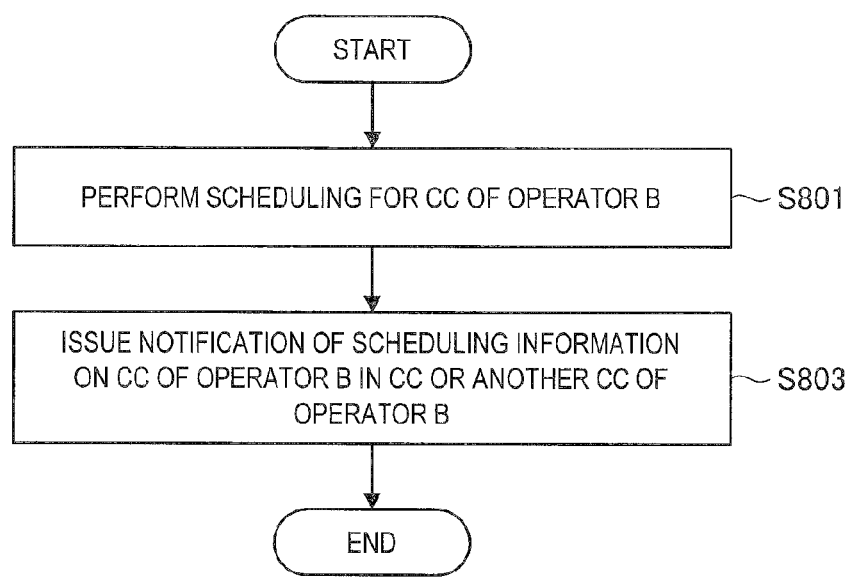
FIG. 20 is a flowchart illustrating an example of processing by a lessee eNodeB according to a fourth modified example for issuing a notification of scheduling information.

Next, an example of processing of the lessee eNodeB 200-1 according to the fourth modified example for issuing a notification of scheduling information will be described with reference to FIG. 20. FIG. 20 is a flowchart illustrating the example of the processing of the lessee eNodeB 200-1 according to the fourth modified example for issuing a notification of scheduling information.

The control unit 240 performs, in step S801, scheduling for the frequency band (CC) 600 of the operator B.

In step S803, the control unit 240 then issues a notification of the scheduling information on the frequency band 600 of the operator B in the frequency band 600 or another frequency band 600 of the operator B via the radio communication unit 210. The processing is then finished.

The first embodiment of the present disclosure has been described so far. However, according to the first embodiment, a UE does not use a leased CC as the PCC. As a result, the processing by a base station is prevented from becoming more complicated in the frequency sharing between different operators.

<<3. Second Embodiment>>

Next, a second embodiment of the present disclosure will be described. Although the second leasing technique is used as a technique of leasing a frequency band in the first embodiment of the present disclosure, the first leasing technique (a frequency band is operated by an eNodeB of a lessee operator) is used in the second embodiment of the present disclosure. According to the second embodiment, a UE does not use a leased CC as the PCC as described in the first embodiment. As a result, the processing by a base station is prevented from becoming more complicated in the frequency sharing between different operators.

<3.1. Overview>

First of all, the overview of the second embodiment will be described with reference to FIG. 21.

Figure 21:
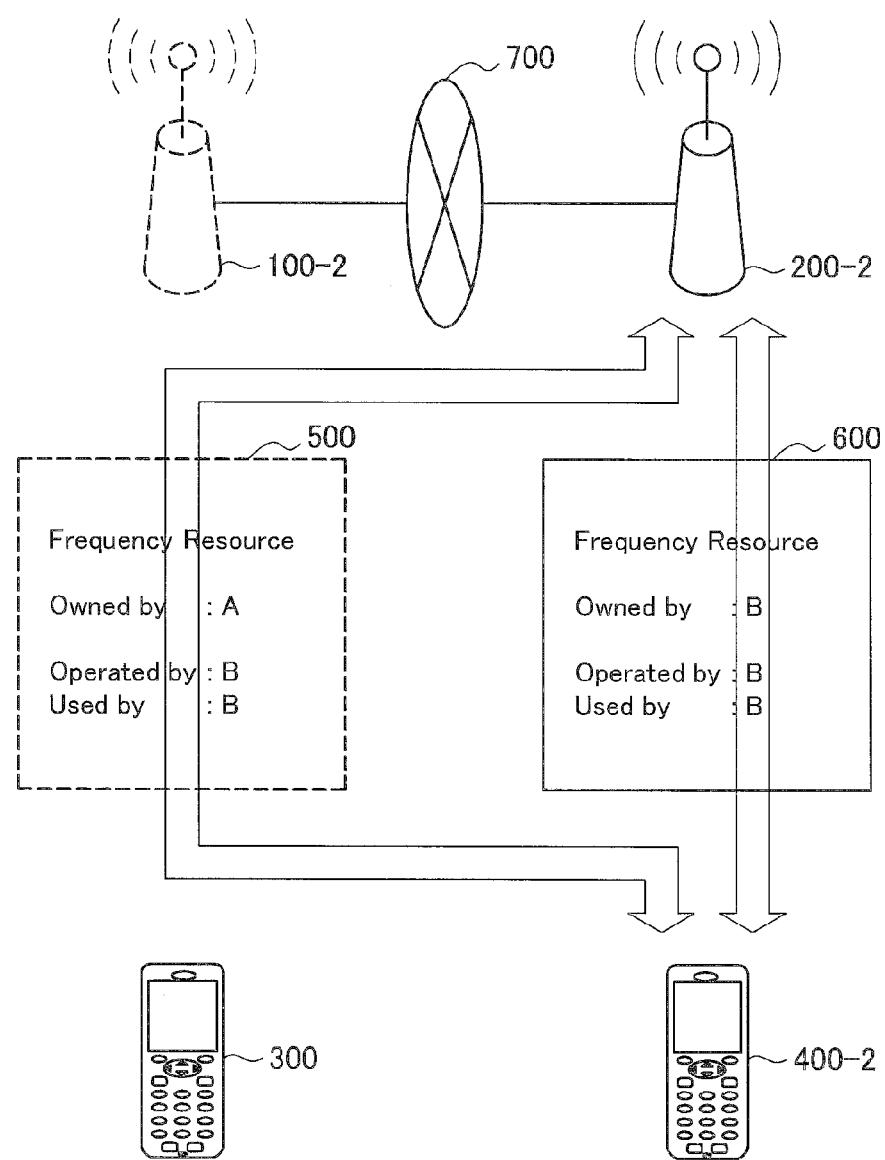
FIG. 21 is an explanatory diagram for describing an overview of a second embodiment.

FIG. 21 is an explanatory diagram for describing the overview of the second embodiment. FIG. 21 illustrates an eNodeB 100-2, a UE 300 and a frequency band 500 of the operator A, and an eNodeB 200-2, a UE 400-2, and a frequency band 600 of the operator B.

The frequency band 500 owned by the operator A is leased to the operator B in the present embodiment. The first leasing technique is used as a technique of leasing a frequency band in the present embodiment. That is, an eNodeB of a lessee operator that has leased a frequency band operates and uses the frequency band to communicate with a UE of the lessee operator that has leased the frequency band. Accordingly, as illustrated in FIG. 21, the UE 400-2 of the lessee operator B, which has leased a frequency band, uses the leased frequency band 500 to communicate the eNodeB 200-2 of the operator B.

The eNodeB 200-2 of the lessee operator B performs control in the present embodiment such that the frequency band 500 (CC) of the operator A is not used by the UE 400-2 of the operator B as the primary frequency band (PCC). That is, the eNodeB 100-1 of the lessor operator A and the eNodeB 200-1 of the lessee operator B perform control in the first embodiment, and yet the eNodeB 200-2 of the lessee operator B performs the control in the second embodiment.

A configuration and a procedure of processing of each apparatus according to the present embodiment will be described below in detail.

<3.2. Configuration of Lessor eNodeB>

Figure 22:
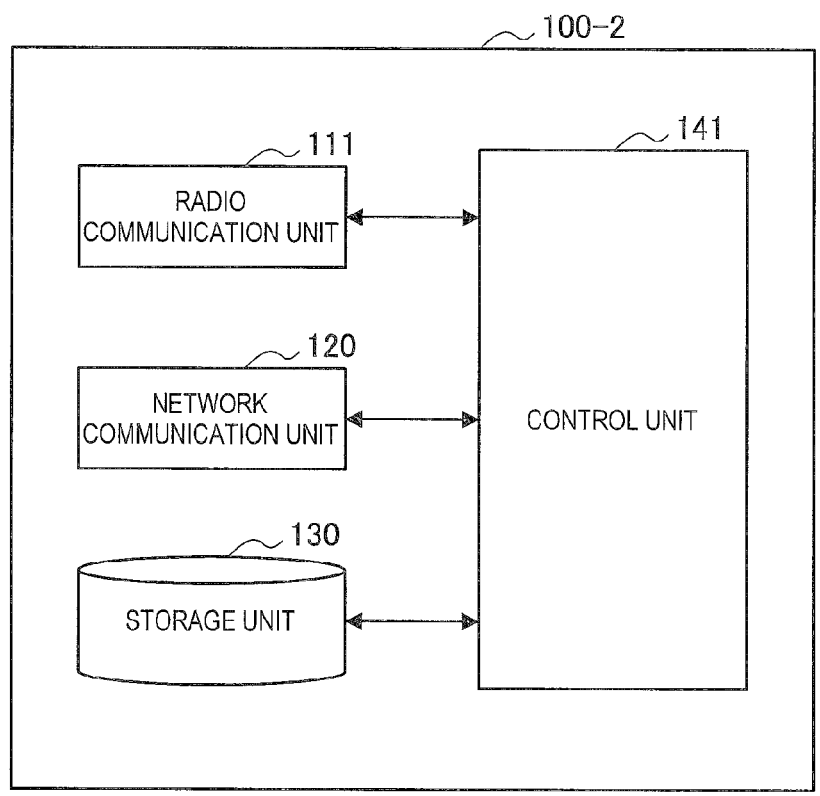
FIG. 22 is a block diagram illustrating an example of a configuration of a lessor eNodeB according to two embodiments.

An example of a configuration of the eNodeB 100-2 (i.e. an eNodeB of the lessor operator A) according to the second embodiment will be described with reference to FIG. 22. FIG. 22 is a block diagram illustrating the example of the configuration of the eNodeB 100-2 according to the second embodiment. FIG. 22 shows that the eNodeB 100-2 includes a radio communication unit 111, a network communication unit 120, a storage unit 130, and a control unit 141.

There is no difference between the first embodiment and the second embodiment in the network communication unit 120 and the storage unit 130. Accordingly, the radio communication unit 111 and the control unit 141 will be described here.

(Radio Communication Unit 111)

The radio communication unit 111 uses a frequency band to wirelessly communicate with a UE in the cell. The radio communication unit 111 includes, for example, an antenna and an RF circuit.

For example, the radio communication unit 111 wirelessly communicates with the UE 300, to which the operator A provides a service. More specifically, the radio communication unit 111 uses the frequency band 500 owned by the operator A in the cell of the eNodeB 100-2 to wirelessly communicate with the UE 300 of the operator A.

(Control Unit 141)

The control unit 141 provides a variety of functions of the eNodeB 100-2. For example, the control unit 141 corresponds to a processor such as a CPU and a DSP, and executes a program stored in the storage unit 130 or another storage medium to provide the variety of functions.

For example, the control unit 140 does not control such access of the UE 400-2 of the operator B that a frequency band 500 among the one or more frequency bands 500 owned by the operator A which is temporarily used by the operator B is not used as the one primary frequency band of the UE 400-2.

<3.3. Configuration of Lessee eNodeB>

Figure 23:
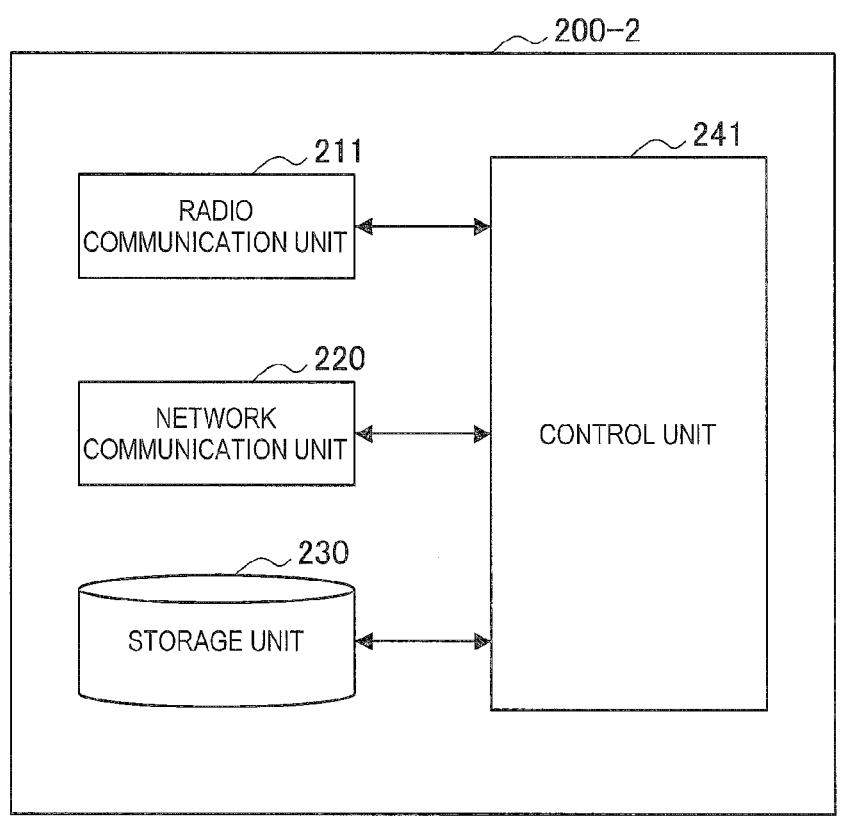
FIG. 23 is a block diagram illustrating an example of a configuration of a lessee eNodeB according to the second embodiment.

An example of a configuration of the eNodeB 200-2 (i.e. an eNodeB of the lessee operator B) according to the second embodiment will be described with reference to FIG. 23. FIG. 23 is a block diagram illustrating the example of the configuration of the eNodeB 200-2 according to the second embodiment. FIG. 23 shows that the eNodeB 200-2 includes a radio communication unit 211, a network communication unit 220, a storage unit 230, and a control unit 240.

There is no difference between the first embodiment and the second embodiment in the network communication unit 220 and the storage unit 230. Accordingly, the radio communication unit 211 and the control unit 241 will be described here.

(Radio Communication Unit 211)

The radio communication unit 211 uses a frequency band to wirelessly communicate with a UE in the cell. The radio communication unit 211 includes, for example, an antenna and an RF circuit.

For example, the radio communication unit 211 wirelessly communicates with the UE 400-2, to which the operator B provides a service. More specifically, the radio communication unit 211 uses the frequency band 600 owned by the operator B in the cell of the eNodeB 200-2 to wirelessly communicate with the UE 400-2 of the operator B. When the frequency band 500 of the operator A is leased to the operator B, the radio communication unit 211 uses the frequency band 500 owned by the operator A in the cell of the eNodeB 200-2 to wirelessly communicate with the UE 400-2 of the operator B.

(Control Unit 241)

The control unit 241 provides a variety of functions of the eNodeB 200-2. For example, the control unit 241 corresponds to a processor such as a CPU and a DSP, and executes a program stored in the storage unit 230 or another storage medium to provide the variety of functions.

The control unit 241 controls the access of the UE 400-2 of the operator B such that a frequency band 500 among the one or more frequency bands 500 owned by the operator A which is temporarily used by the operator B is not used as the one primary frequency band of the UE 400-2.

More specifically, the control unit 241 does not, for example, arrange a synchronization signal at a position in the frequency direction which is searched for by the UE 400-2 of the operator B in the frequency band 500 temporarily used by the operator B. This processing is the same processing as performed by the eNodeB 100-1 of the operator A in the first embodiment, and attains the same effect as that of the first embodiment.

When the one primary frequency band used by the UE 400-2 of the operator B is changed, the control unit 241 does not, for example, select the frequency band 500 temporarily used by the operator B as the one primary frequency band. This processing is also the same processing as performed by the eNodeB 200-1 of the operator B in the first embodiment, and attains the same effect as that of the first embodiment.

<3.4. Configuration of Lessee UE>

Figure 24:
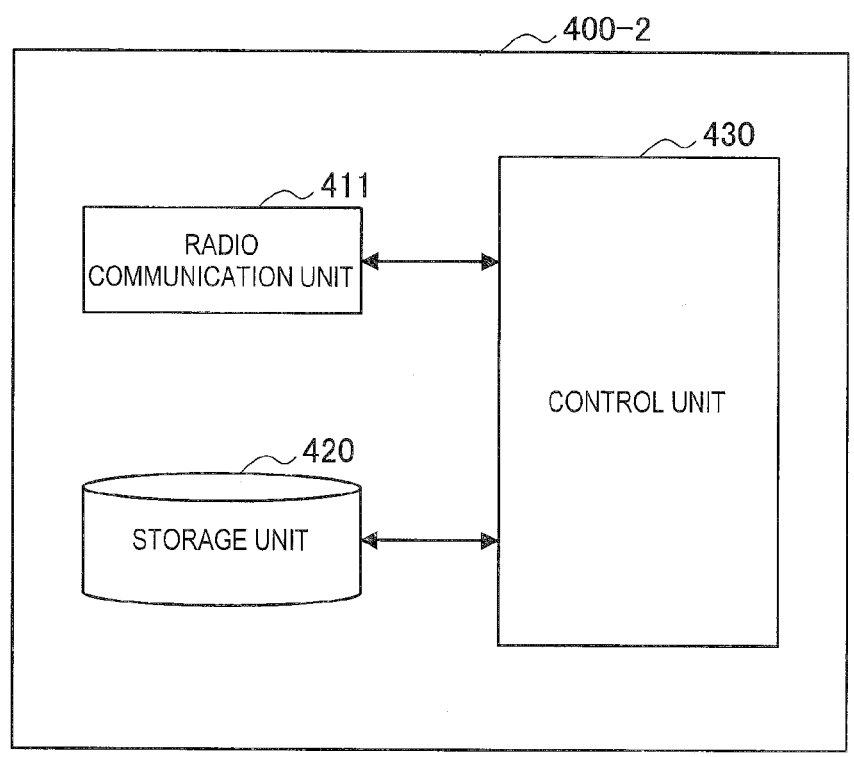
FIG. 24 is a block diagram illustrating an example of a configuration of a lessee UE according to the second embodiment.

An example of a configuration of the UE 400-2 (i.e. an eNodeB of the lessee operator B) according to the second embodiment will be described with reference to FIG. 24. FIG. 24 is a block diagram illustrating the example of the configuration of the UE 400-2 according to the second embodiment. FIG. 24 shows that the UE 400-2 includes a radio communication unit 411, a storage unit 420, and a control unit 430.

There is no difference between the first embodiment and the second embodiment in the storage unit 420 and the control unit 430. Accordingly, the radio communication unit 411 will be described here.

(Radio Communication Unit 411)

The radio communication unit 411 uses a frequency band to wirelessly communicate with an eNodeB in the cell. The radio communication unit 411 includes, for example, an antenna and an RF circuit.

For example, the radio communication unit 411 wirelessly communicates with the eNodeB 200-2 of the operator B. More specifically, the radio communication unit 410 uses the frequency band 600 owned by the operator B in the cell of the eNodeB 200-2 to wirelessly communicate with the eNodeB 200-2. When the frequency band 500 of the operator A is leased to the operator B, the radio communication unit 411 uses the frequency band 500 owned by the operator A in the cell of the eNodeB 200-2 to wirelessly communicate with the eNodeB 200-2 of the operator B.

Additionally, the radio communication unit 411 can wirelessly communicate with a base station by using the one primary frequency band and the one or more secondary frequency bands. For example, the UE 400-2 is a UE supporting the carrier aggregation, and is capable of radio communication by using the one PCC and the one or more SCCs.

<3.5. Procedure of Processing>

The processing for preventing a leased frequency band from being used as the PCC has been described with reference to FIGS. 15 and 16 in the first embodiment. More specifically, the processing of establishing a connection and the processing after the connection is established have been described. There is no difference between the first embodiment and the second embodiment in the processing after a connection is established. Meanwhile, there is no difference between the first embodiment and the second embodiment in the processing of establishing a connection, and yet they are different in that the performer is the eNodeB 100 of the operator A or the eNodeB 200 of the operator B.

Additionally, the modified example 1 of the first embodiment can also be used in the second embodiment.

The second embodiment of the present disclosure has been described so far. However, according to the second embodiment, a leased CC is not used by a UE as the PCC. As a result, the processing by a base station is prevented from becoming more complicated in the frequency sharing between different operators.

<<4. Conclusion>>

The embodiments of the present disclosure have been described so far with reference to FIGS. 1 to 24. According to the present embodiment, the access of the UE 400 is controlled such that a frequency band 500 among the one or more frequency bands 500 owned by the operator A which is temporarily used by the operator B is not used as the one primary frequency band of the UE 400 of the operator B.

For example, no synchronization signal is arranged at a position in the frequency direction which is searched for by the UE 400 of the operator B in the frequency band 500 temporarily used by the operator B. This disables the UE 400 of the operator B from performing synchronization in the frequency band 500 leased from the operator A when a connection is established. That is, the UE 400 in the RRC Idle state cannot perform synchronization by using a PSS and an SSS in order to come into the radio resource control (RRC) Connected state when doing a cell search in the frequency band 500 leased from the operator A. Accordingly, the UE 400 of the operator B cannot use a frequency band leased from the operator A when a connection is established. Thus, it is possible to prevent the leased frequency band 500 of the operator A from being the PCC when a connection is established.

For example, when the one primary frequency band used by the UE 400 of the operator B is changed, the frequency band 500 temporarily used by the operator B is not selected as the one primary frequency band. If the leased CC is not selected as the PCC when the PCC is changed in this way, it is possible to prevent the leased frequency band 500 of the operator A from being the PCC after a connection is established.

For example, the UE 400 may be notified that the UE 400 is barred from establishing a new connection by using the frequency band 500 temporarily used by the operator B as the one primary frequency band. This prevents the UE 400 of the operator B from establishing a connection in the frequency band 500 leased from the operator A. That is, the UE 400 in the RRC Idle state is synchronized by using a synchronization signal, and then confirms the barring in the system information of the frequency band 500 in order to come into the radio resource control (RRC) Connected state. As a result, the UE 400 stops establishing a connection in the frequency band 500 leased from the operator A. It is thus possible to prevent the leased frequency band 500 of the operator A from being the PCC when a connection is established.

For example, the frequency band 500 temporarily used by the operator B may be used on an uplink, or may also be used on a downlink in a pair with another frequency band 500 among the one or more frequency bands 500 owned by the operator A which is temporarily used by the operator B on the uplink. Limiting the link direction in this way prevents the leased frequency band 500 from being paired with the frequency band 600 that is an uplink CC. There is thus no need to transmit linkage information in the leased frequency band 500, the linkage information indicating the linkage with the frequency band 600 that is an uplink CC. Accordingly, it is possible to prevent the procedure for the operator B to send linkage information from becoming more complicated.

For example, the frequency band 500 temporarily used by the operator B is used on a downlink in a pair with another frequency band that is not owned by the operator A, but used by the operator B on an uplink. In this case, the UE 400 may be notified in the frequency band 600 owned by the operator B of information indicating the linkage between the frequency band 500 used on the downlink and the other frequency band used on the uplink. A notification of linkage information is issued in this way, so that a notification of linkage information does not need to be issued in system information of the frequency band 500 even if the leased frequency band 500 is used as a downlink CC and the frequency band 600 is used as an uplink CC. Accordingly, it is possible to prevent the procedure for the operator B to send linkage information from becoming more complicated.

For example, when the frequency band 500 temporarily used by the operator B is used as a downlink frequency band, a notification of scheduling information on a frequency band owned by the operator B does not have to be issued in the frequency band 500. Notification of scheduling information in this way can reduce burdens on the eNodeB 100 of the lessor operator A even if cross carrier scheduling is used.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

It has been described that a radio communication system of an operator is, for example, a radio communication system of LTE-A. However, the radio communication system of the operator is not limited thereto. For example, the radio communication system of the operator may be similar to a radio communication system of LTE-A, or a radio communication system compliant with a standard more evolved than LTE-A.

A communication control apparatus for a cell is an eNodeB of LTE-Advanced in the embodiment. However, the present technology is not limited to the example. For example, the communication control apparatus may be a base station compliant with another communication standard or an apparatus partially composing the base station. The communication control apparatus may be another apparatus that controls a base station.

A terminal apparatus that communicates in a cell is a UE of LTE-Advanced in the embodiment. However, the present technology is not limited to the example. For example, the terminal apparatus may be compliant with another communication standard.

It has been described that one operator is a lessor that leases a frequency band, while the other operator is a lessee that leases the frequency band. However, the present technology is not limited to the example. For example, both of the operators may be lessors that lease frequency bands, or may be lessees that lease frequency bands. In this case, an eNodeB may have both functions as a lessor and a lessee.

Processing steps in the various communication control processing in the present description do not necessarily have to be performed in the chronological order described in the flowcharts. For example, the processing steps in the various communication control processing may be performed in order different from the order described as the flowcharts, or may be performed in parallel.

It is possible to produce a computer program for causing hardware such as a CPU, ROM, and RAM built in a communication control apparatus or a terminal apparatus to execute a function corresponding to each configuration of the communication control apparatus or the terminal apparatus. There is also provided a storage medium having the computer program stored therein.

Additionally, the present technology of the present disclosure may also be configured as below.

(1)

A communication control apparatus including:

a radio communication unit configured to wirelessly communicate with a terminal apparatus to which a first operator provides a radio communication service, the terminal apparatus being capable of radio communication by using one primary frequency band and at least one secondary frequency band; and a control unit configured to control access of the terminal apparatus in a manner that a frequency band among one or more frequency bands owned by a second operator is not used as the one primary frequency band of the terminal apparatus, the frequency band being temporarily used by the first operator.

(2)

The communication control apparatus according to (1), wherein the communication control apparatus is a base station of the first operator or the second operator, and wherein the control unit does not arrange a synchronization signal at a position in a frequency direction, the position being searched for by the terminal apparatus in the frequency band temporarily used by the first operator.

(3)

The communication control apparatus according to (2), wherein the control unit does not arrange the synchronization signal in the frequency band temporarily used by the first operator.

(4)

The communication control apparatus according to (2), wherein the control unit shifts the position of the synchronization signal in the frequency direction in the frequency band temporarily used by the first operator from the position in the frequency direction, the position being searched for by the terminal apparatus.

(5)

The communication control apparatus according to (1), wherein the communication control apparatus is a base station of the first operator or the second operator, and wherein the control unit notifies the terminal apparatus that the terminal apparatus is barred from establishing a new connection by using the frequency band temporarily used by the first operator as the one primary frequency band.

(6)

The communication control apparatus according to any one of (1) to (5), wherein the communication control apparatus is a base station of the first operator, and wherein, when the one primary frequency band used by the terminal apparatus is changed, the control unit does not select the frequency band temporarily used by the first operator as the one primary frequency band.

(7)

The communication control apparatus according to any one of (1) to (6), wherein the frequency band temporarily used by the first operator is used on an uplink, or used on a downlink in a pair with another frequency band among the one or more frequency bands owned by the second operator, the other frequency band being temporarily used by the first operator on the uplink.

(8)

The communication control apparatus according to any one of (1) to (6), wherein, when the frequency band temporarily used by the first operator is used on a downlink in a pair with another frequency band that is not owned by the second operator, but is used by the first operator on an uplink, the terminal apparatus is notified in a frequency owned by the first operator of information indicating linkage between the frequency band used on the downlink and the other frequency band used on the uplink.

(9)

The communication control apparatus according to any one of (1) to (8), wherein, when the frequency band temporarily used by the first operator is used as a downlink frequency band, the terminal apparatus is not notified in the frequency band of scheduling information on a frequency band owned by the second operator.

(10)

The communication control apparatus according to any one of (1) to (9), wherein the radio communication unit wirelessly communicates with the terminal apparatus in accordance with a communication scheme related to long term evolution (LTE), wherein the frequency band is a component carrier, wherein the one primary frequency band is a primary component carrier, and wherein the secondary frequency band is a secondary component carrier.

(11)

A terminal apparatus including:

a radio communication unit capable of wirelessly communicating with a base station by using one primary frequency band and at least one secondary frequency band; and a control unit configured to, when a synchronization signal is not arranged at a position in a frequency direction which is searched for by the terminal apparatus in a frequency band among one or more frequency bands owned by a second operator which is temporarily used by a first operator that provides a radio communication service to the terminal apparatus, and when the frequency band temporarily used by the first operator is used as the secondary frequency band of the terminal apparatus, perform synchronization in the frequency band by using the frequency band without using the synchronization signal at the position in the frequency direction in a manner that the frequency band temporarily used by the first operator is not used as the one primary frequency band of the terminal apparatus.

(12)

A communication control method including:

wirelessly communicating with a terminal apparatus to which a first operator provides a radio communication service, the terminal apparatus being capable of radio communication by using one primary frequency band and at least one secondary frequency band; and controlling access of the terminal apparatus in a manner that a frequency band among one or more frequency bands owned by a second operator is not used as the one primary frequency band of the terminal apparatus, the frequency band being temporarily used by the first operator.

REFERENCE SIGNS LIST 10, 20 cell
11, 21 eNodeB
13, 23 user equipment (UE)
15, 25 frequency band
100 (lessor) eNodeB
110, 111 radio communication unit
120 network communication unit
130 storage unit
140, 141 control unit
200 (lessee) eNodeB
210, 211 radio communication unit
220 network communication unit
230 storage unit
240, 241 control unit
400 (lessee) UE
410, 411 radio communication unit
420 storage unit
430 control unit

The invention claimed is:

1. A communication control apparatus, comprising:
a memory configured to store instructions; and
one or more processors, coupled with the memory, configured to:
  wirelessly communicate with a terminal apparatus to which a first operator provides a radio communication service, wherein the terminal apparatus is configured to communicate wirelessly based on one primary frequency band and at least one secondary frequency band;
  control access of the terminal apparatus in a manner that a first frequency band among at least one frequency band owned by a second operator is unused as the one primary frequency band of the terminal apparatus, wherein the first frequency band is temporarily used by the first operator; and
  shift a position of a synchronization signal in a frequency direction in the first frequency band from a position which is searched by the terminal apparatus.

2. The communication control apparatus according to claim 1,
wherein the communication control apparatus is a base station of one of the first operator or the second operator,
wherein the synchronization signal is unarranged at the position in the frequency direction, and
wherein the position is searched for by the terminal apparatus in the first frequency band.

3. The communication control apparatus according to claim 1,
wherein the synchronization signal is unarranged in the first frequency band.

4. The communication control apparatus according to claim 1,
wherein the communication control apparatus is a base station of one of the first operator or the second operator, and wherein the one or more processors are further configured to notify the terminal apparatus that the terminal apparatus is barred to establish a new connection based on the first frequency band as the one primary frequency band.

5. The communication control apparatus according to claim 1,
wherein the communication control apparatus is a base station of the first operator, and
wherein, based on a determination that the one primary frequency band used by the terminal apparatus is changed, the first frequency band is unselected as the one primary frequency band.

6. The communication control apparatus according to claim 1,
wherein the first frequency band is used on an uplink, or used on a downlink in a pair with a second frequency band among the at least one frequency band owned by the second operator, wherein the second frequency band is temporarily used by the first operator on the uplink.

7. The communication control apparatus according to claim 1,
wherein, based on usage of the first frequency band on a downlink in a pair with a second frequency band that has ownership that is different from the second operator, but is used by the first operator on an uplink, the terminal apparatus is notified in a frequency owned by the first operator of information that indicates linkage between the first frequency band used on the downlink and the second frequency band used on the uplink.

8. The communication control apparatus according to claim 1,
wherein, based on usage of the first frequency band as a downlink frequency band, the terminal apparatus is unnotified in the first frequency band to schedule information on a second frequency band owned by the second operator.

9. The communication control apparatus according to claim 1,
wherein the one or more processors are further configured to wirelessly communicate with the terminal apparatus based on a communication scheme related to long term evolution (LTE),
wherein the first frequency band is a component carrier,
wherein the one primary frequency band is a primary component carrier, and
wherein the at least one secondary frequency band is a secondary component carrier.

10. A terminal apparatus, comprising:
a memory configured to store instructions; and
one or more processors, coupled with the memory, configured to:
  wirelessly communicate with a base station based on one primary frequency band and at least one secondary frequency band;
  based on a determination that a synchronization signal is unarranged at a position in a frequency direction which is searched for by the terminal apparatus in a frequency band among at least one frequency band owned by a second operator which is temporarily used by a first operator that provides a radio communication service to the terminal apparatus, and based on usage of the frequency band as the at least one secondary frequency band of the terminal apparatus, synchronize in the frequency band based on the frequency band excluding usage of the synchronization signal at the position in the frequency direction in a manner that the frequency band is unused as the one primary frequency band of the terminal apparatus; and shift a position of the synchronization signal in the frequency direction in the frequency band from the position which is searched by the terminal apparatus.

11. A communication control method, comprising:

wirelessly communicating with a terminal apparatus to which a first operator provides a radio communication service, the terminal apparatus being capable of radio communication by using one primary frequency band and at least one secondary frequency band; and controlling access of the terminal apparatus in a manner that a frequency band among at least one frequency band owned by a second operator is unused as the one primary frequency band of the terminal apparatus, the frequency band being temporarily used by the first operator, wherein a position of a synchronization signal is shifted in a frequency direction in the frequency band from a position which is searched by the terminal apparatus.

* * * * *